April 7, 1931. A. E. CRANSTON 1,799,958
METHOD OF AND APPARATUS FOR MAKING COMPOSITE LUMBER
Filed Feb. 26, 1927 20 Sheets-Sheet 3
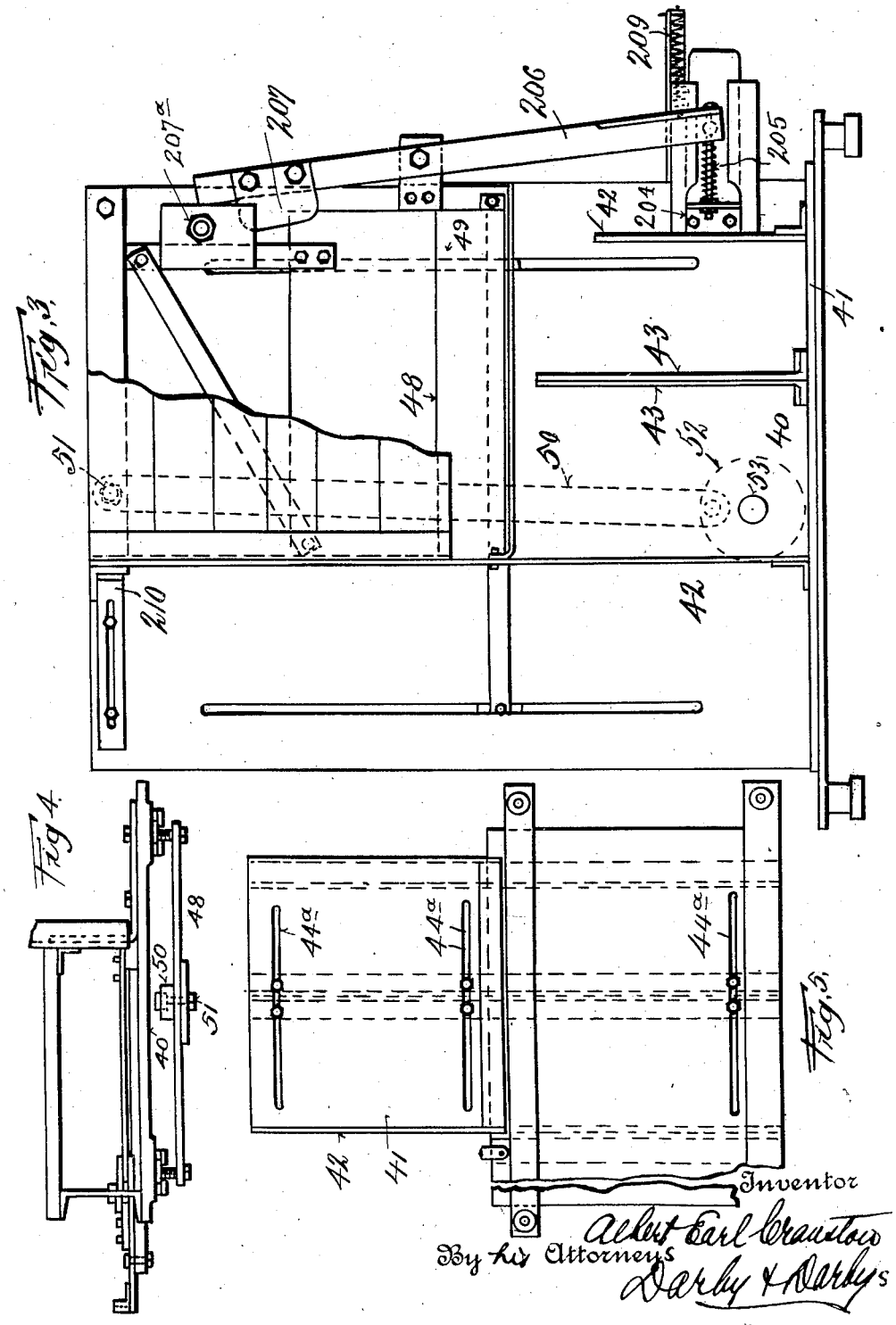

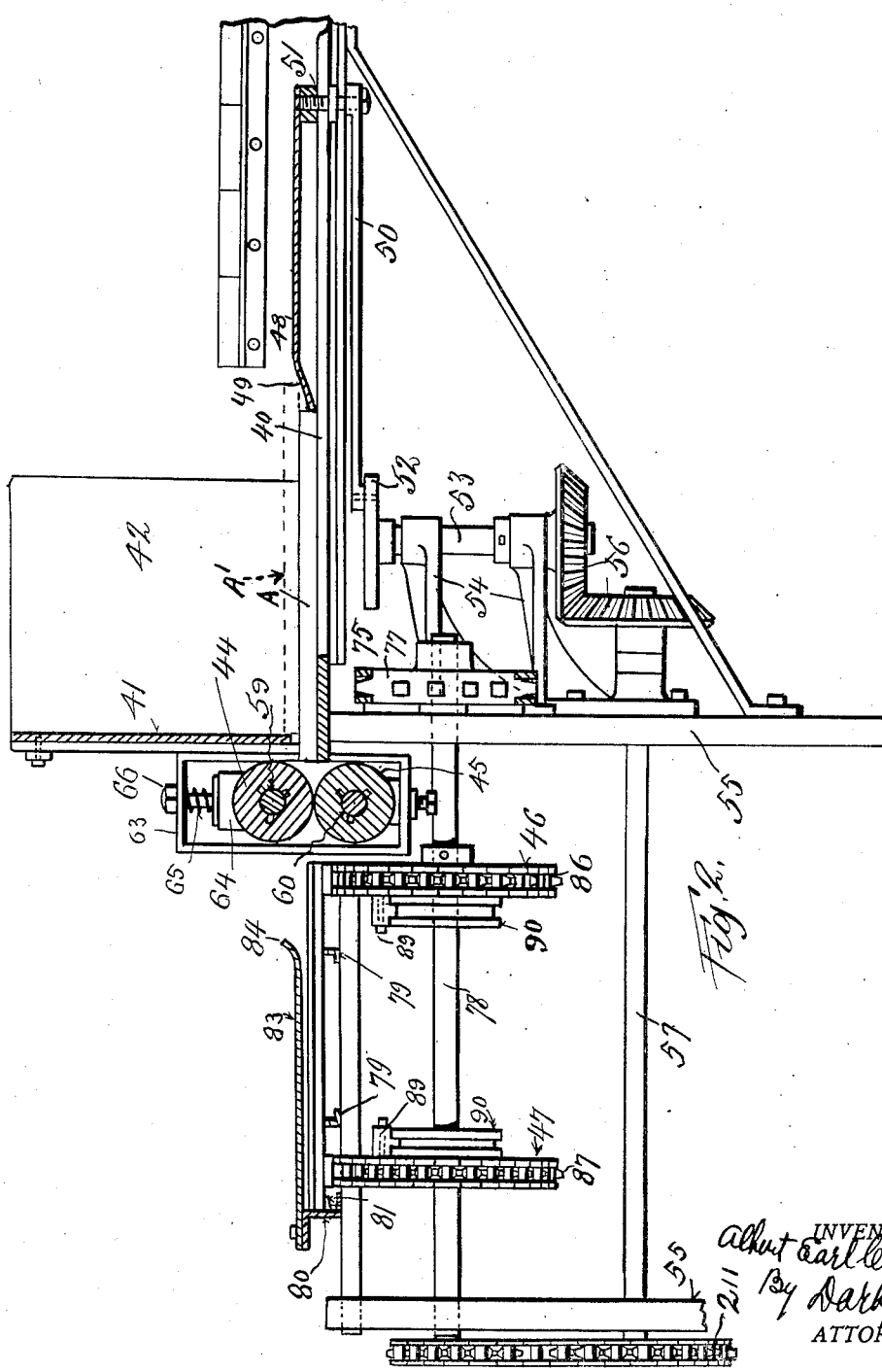

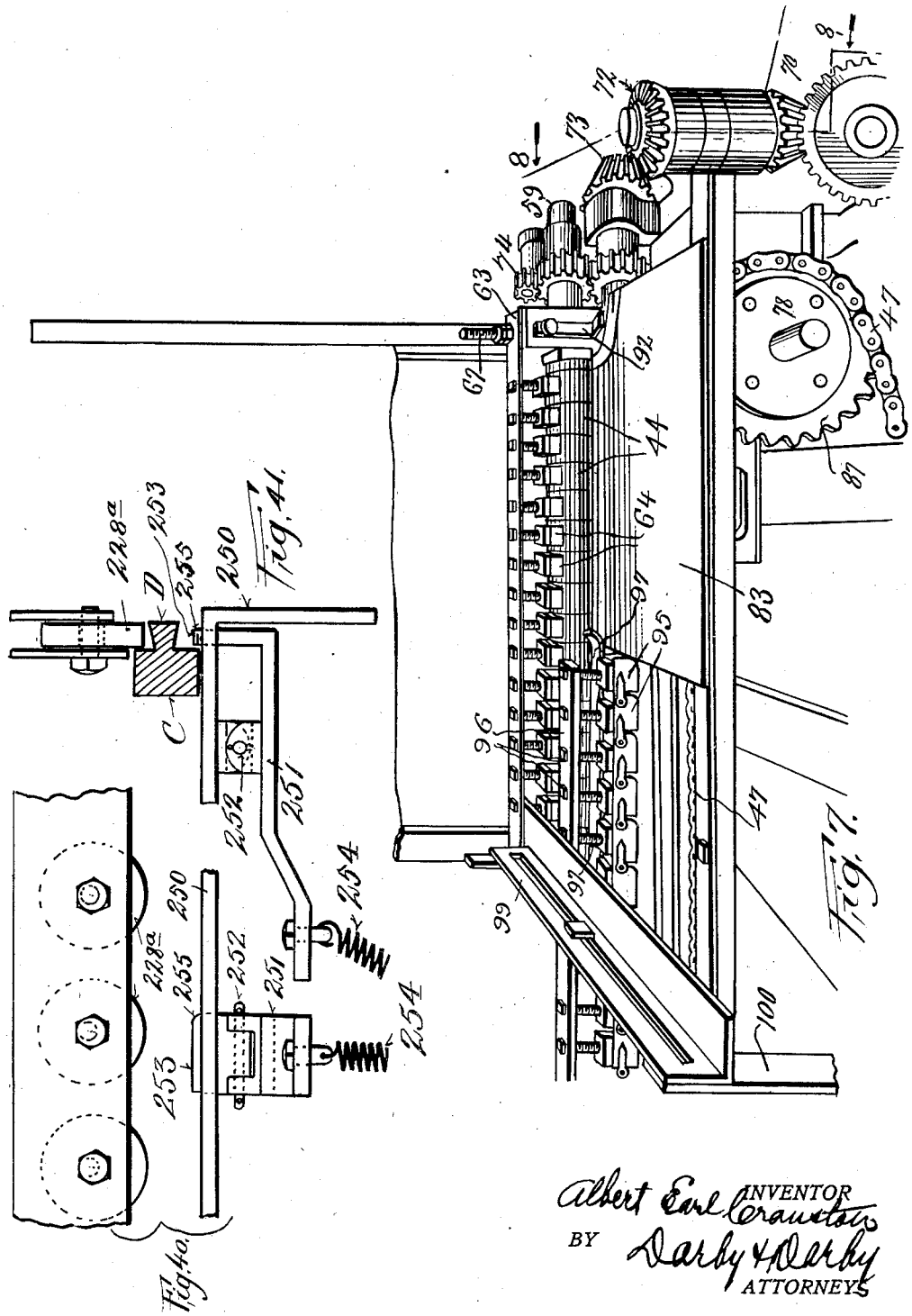

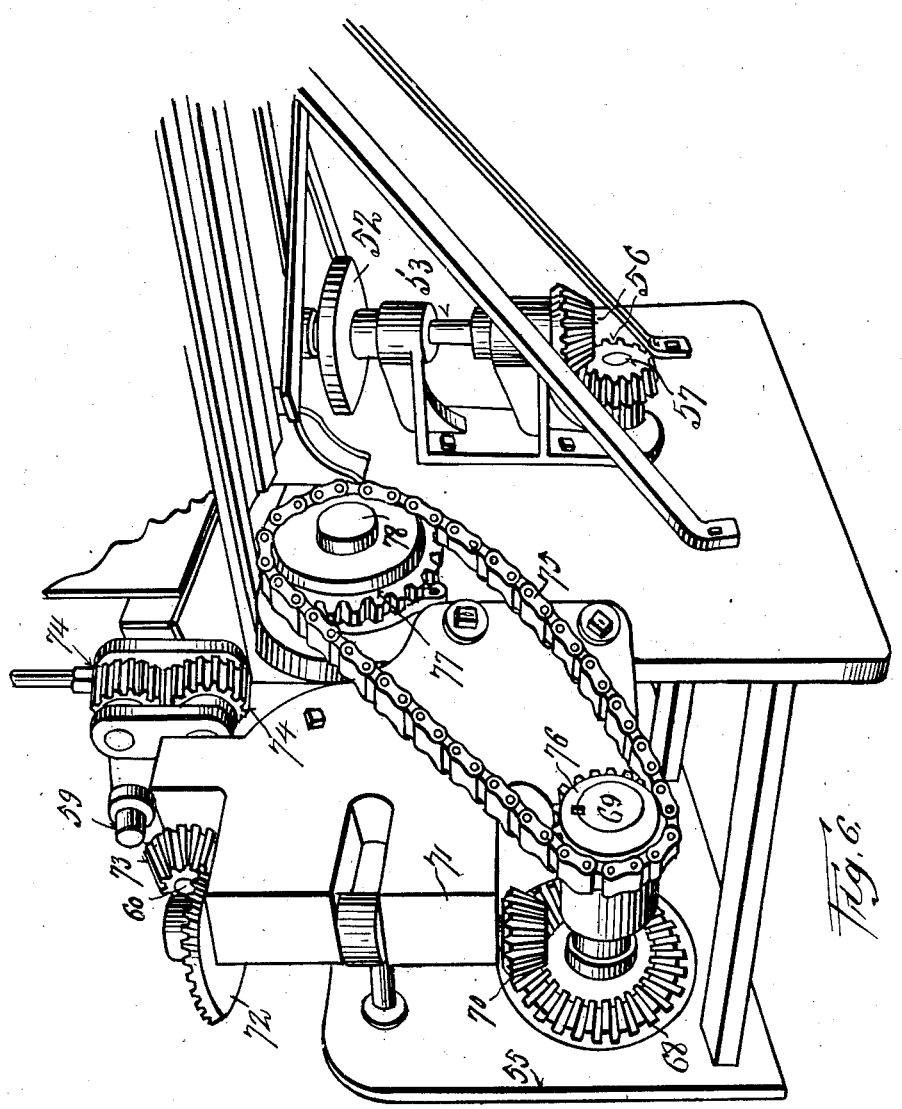

April 7, 1931. A. E. CRANSTON 1,799,958
METHOD OF AND APPARATUS FOR MAKING COMPOSITE LUMBER
Filed Feb. 26, 1927 20 Sheets-Sheet 6
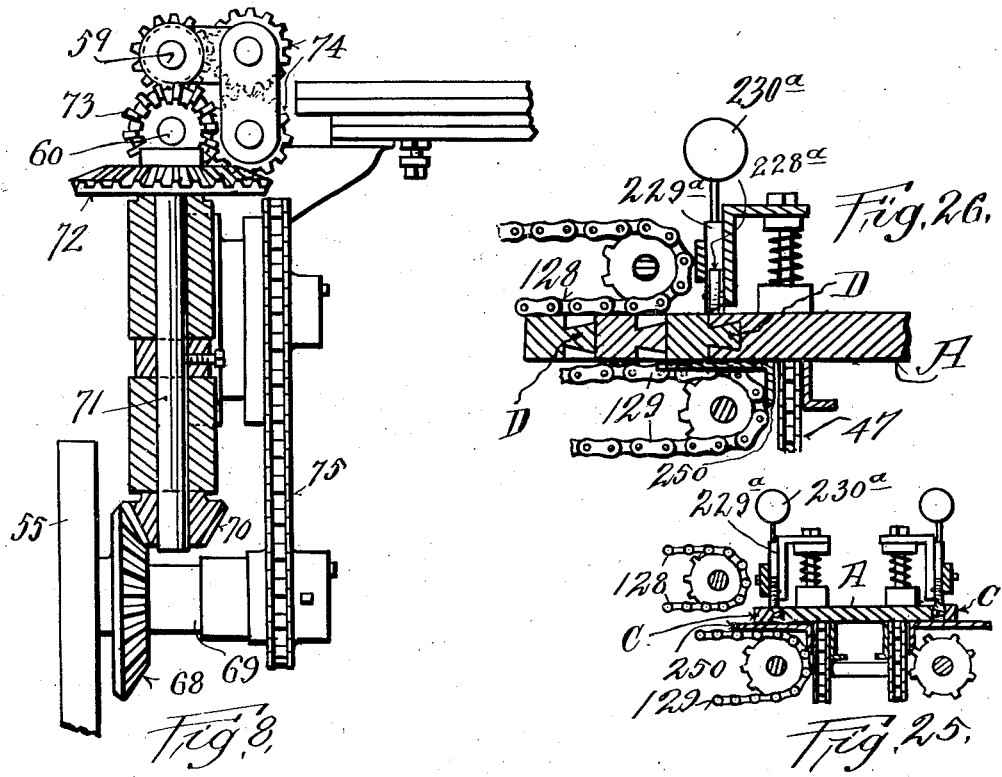
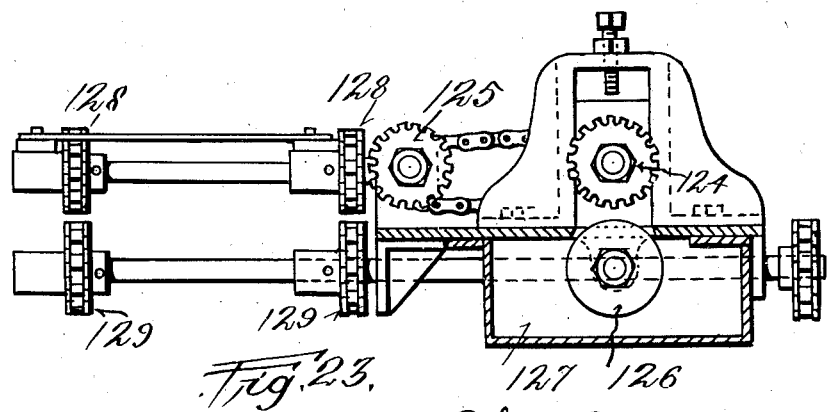

April 7, 1931. A. E. CRANSTON 1,799,958
METHOD OF AND APPARATUS FOR MAKING COMPOSITE LUMBER
Filed Feb. 26, 1927. 20 Sheets-Sheet 8
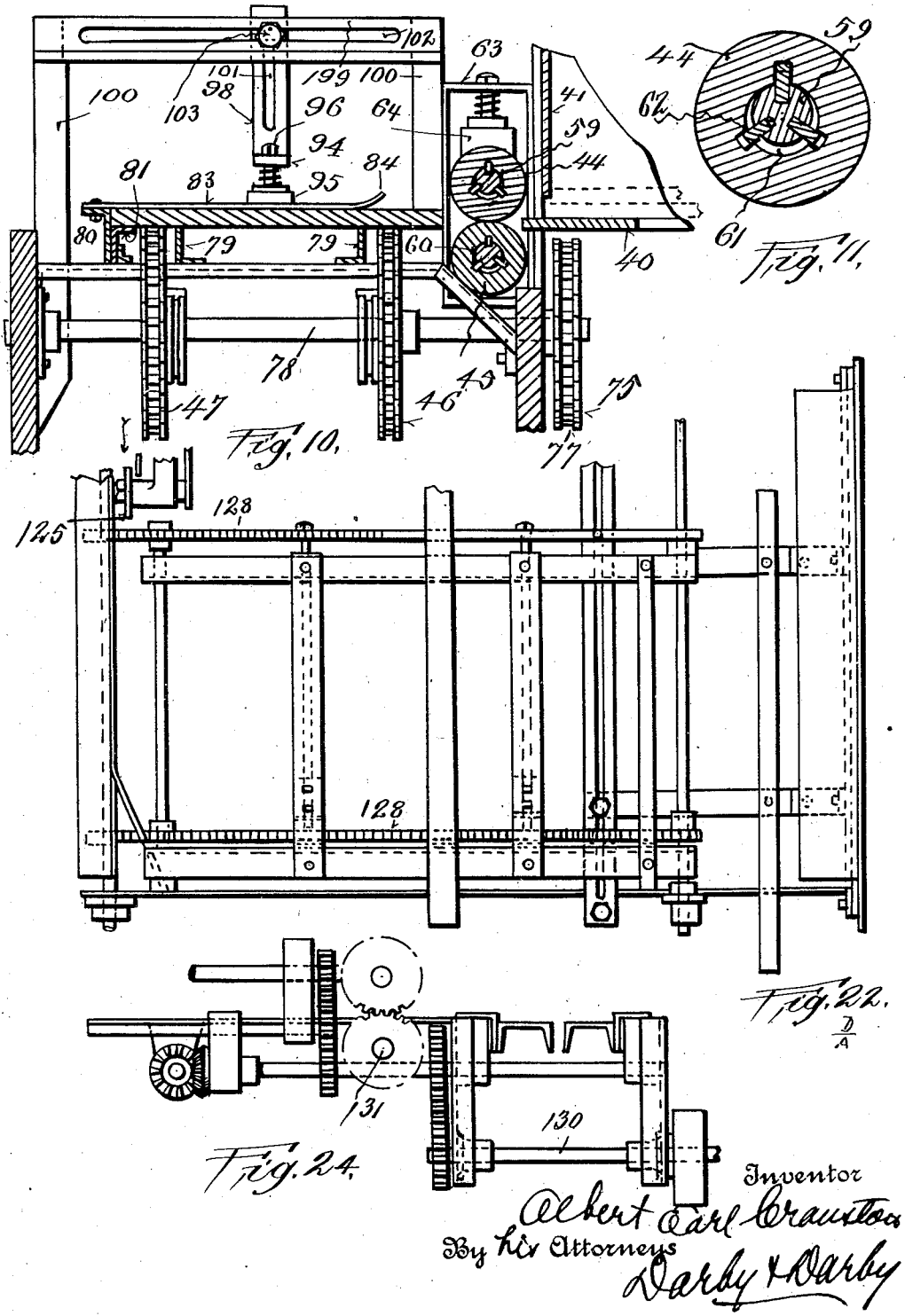

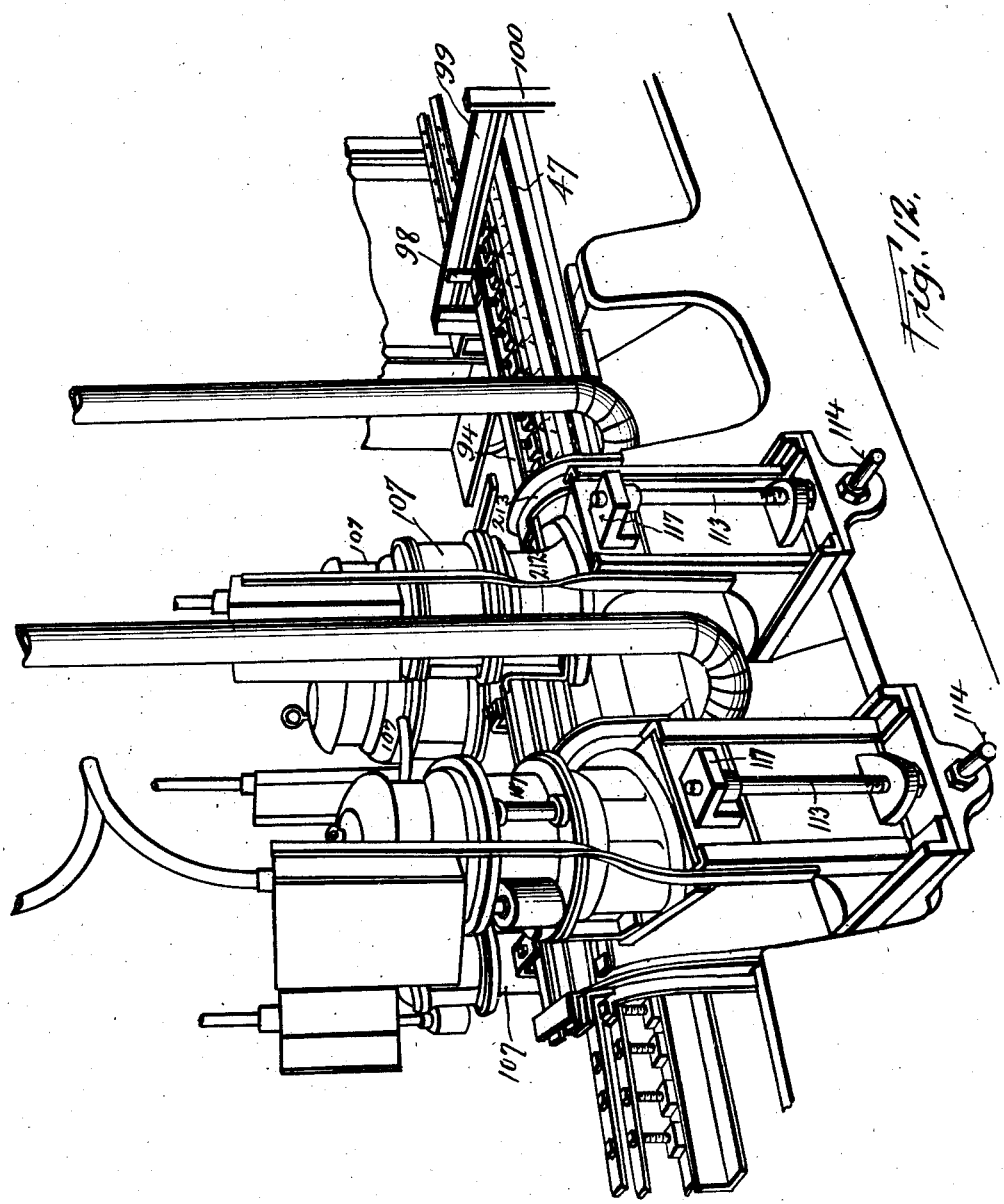

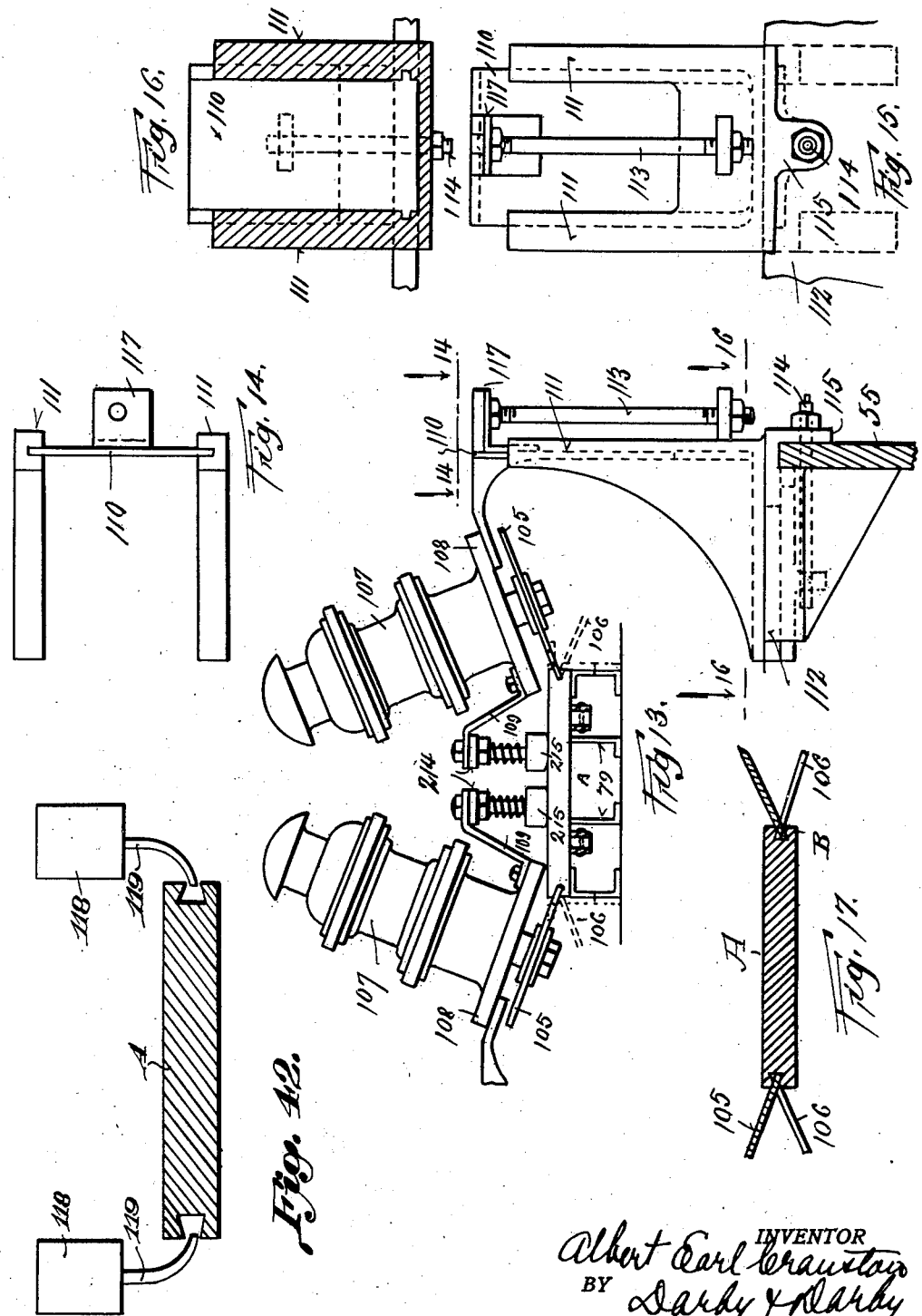

April 7, 1931. A. E. CRANSTON 1,799,958
METHOD OF AND APPARATUS FOR MAKING COMPOSITE LUMBER
Filed Feb. 26, 1927 20 Sheets-Sheet 11
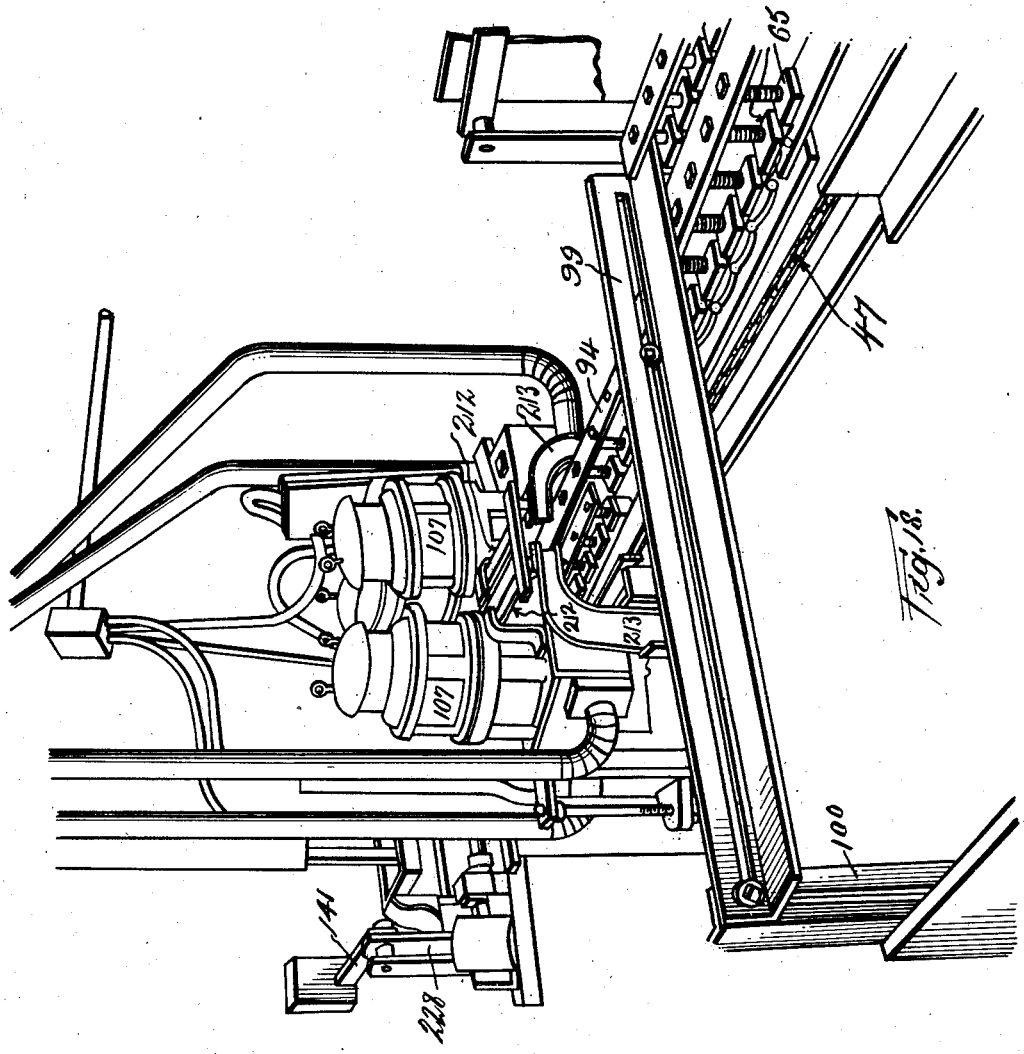
INVENTOR
Albert Earl Cranston
BY Darby & Darby
ATTORNEYS

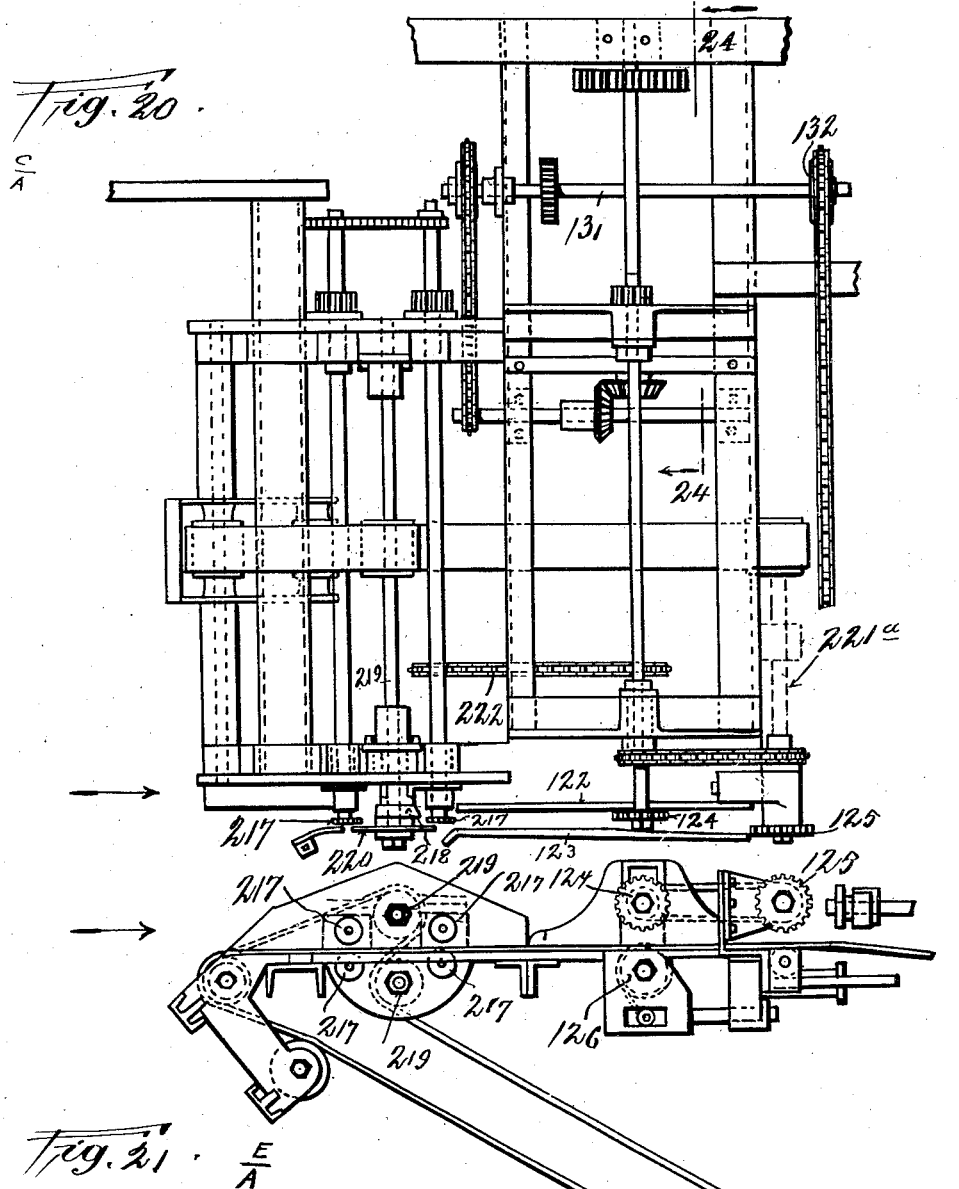

April 7, 1931. A. E. CRANSTON 1,799,958
METHOD OF AND APPARATUS FOR MAKING COMPOSITE LUMBER
Filed Feb. 26, 1927 20 Sheets-Sheet 14
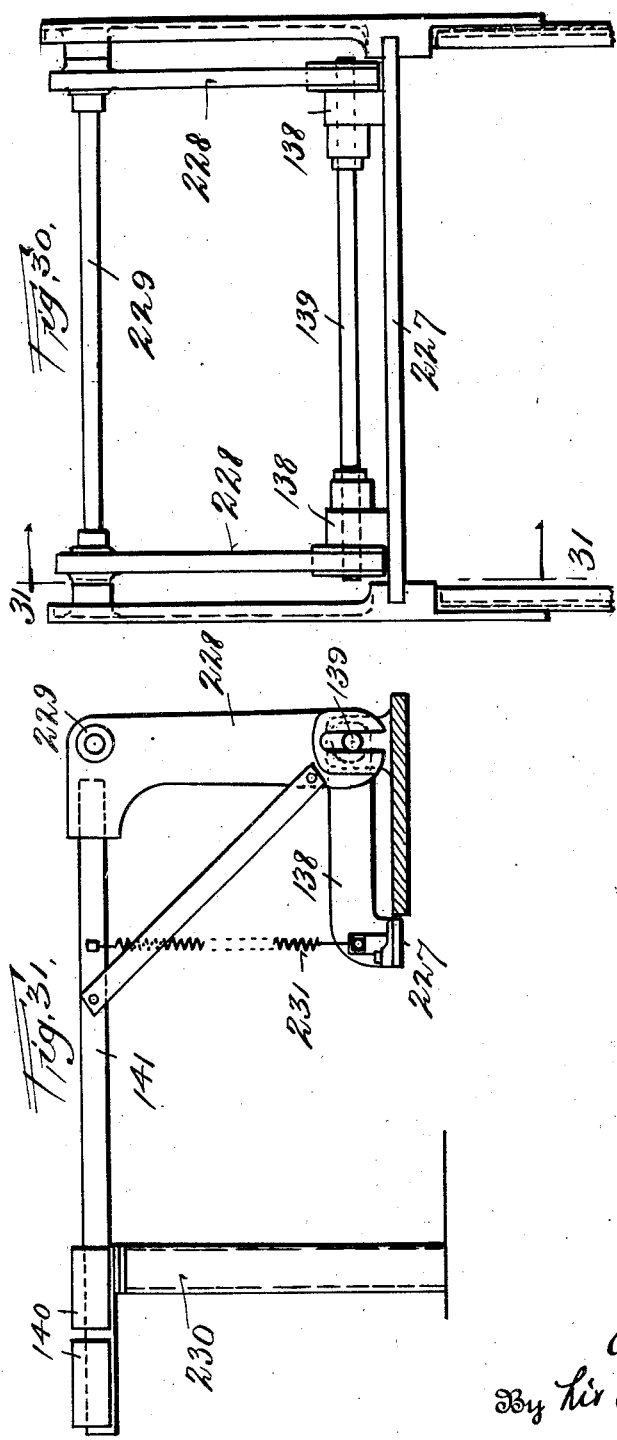
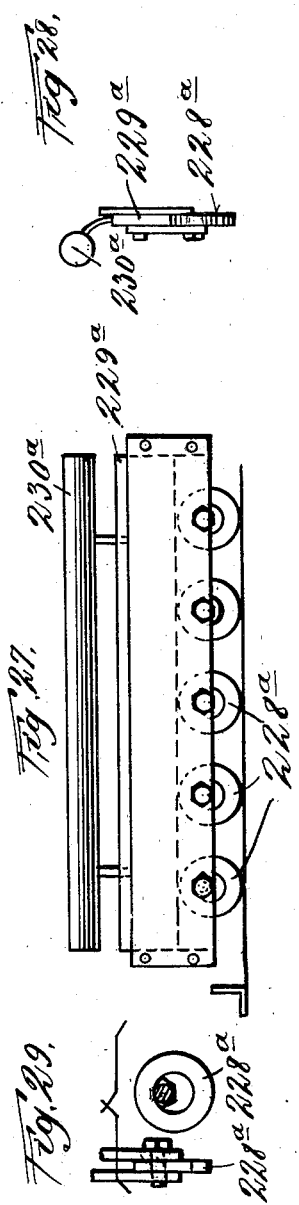

April 7, 1931.   A. E. CRANSTON   1,799,958
METHOD OF AND APPARATUS FOR MAKING COMPOSITE LUMBER
Filed Feb. 26, 1927   20 Sheets-Sheet 15
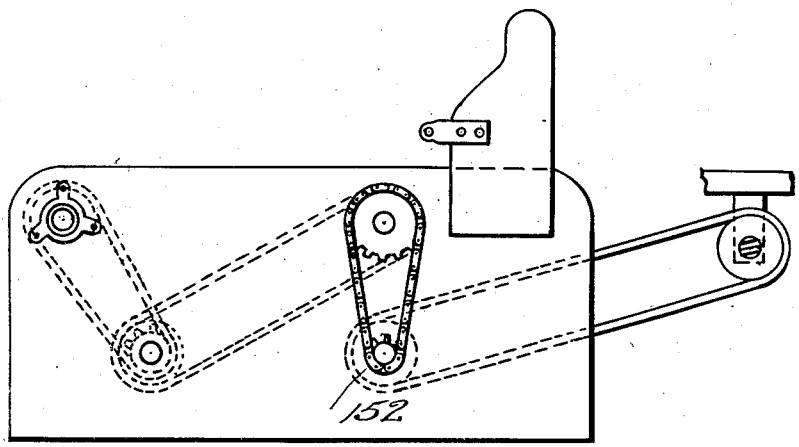
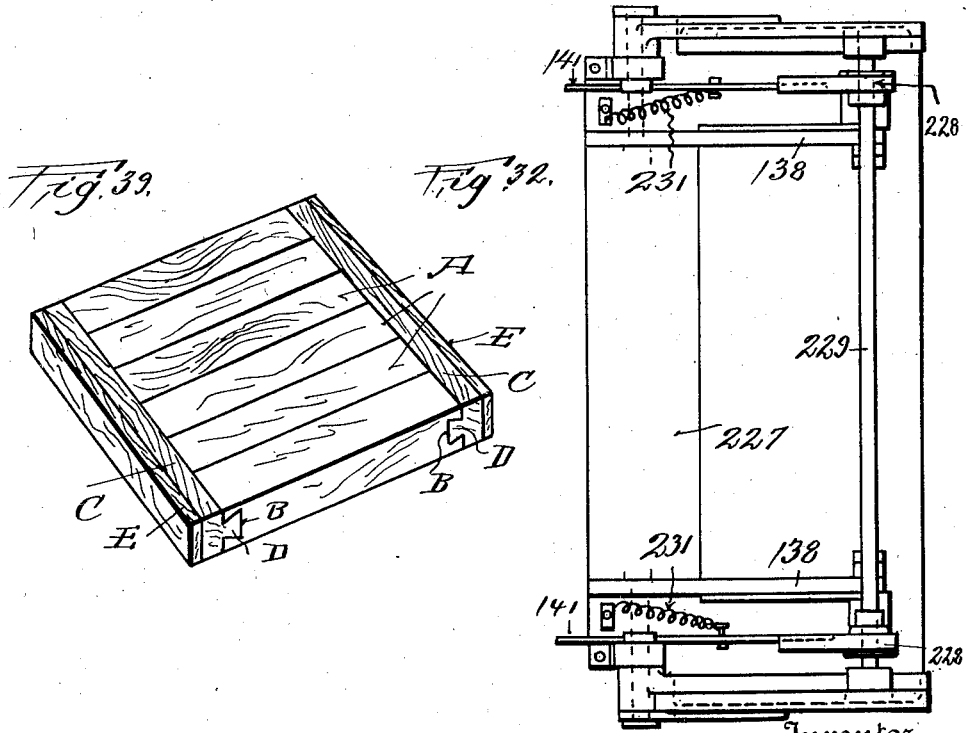
Inventor
Albert Earl Cranston
By his Attorneys
Darby & Darby April 7, 1931. A. E. CRANSTON 1,799,958
METHOD OF AND APPARATUS FOR MAKING COMPOSITE LUMBER
Filed Feb. 26, 1927 20 Sheets-Sheet 16
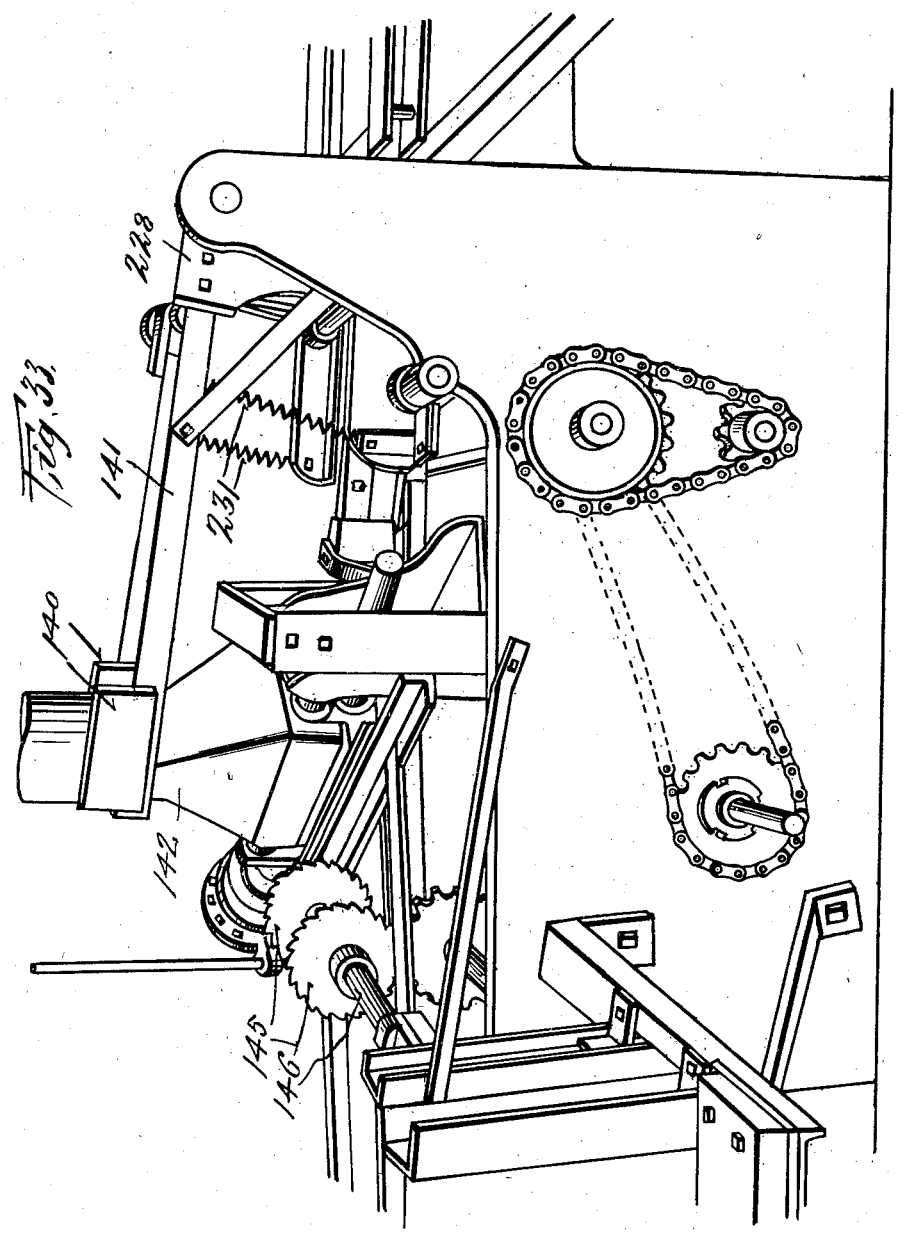

April 7, 1931. A. E. CRANSTON 1,799,958
METHOD OF AND APPARATUS FOR MAKING COMPOSITE LUMBER
Filed Feb. 26, 1927 20 Sheets-Sheet 17

INVENTOR
Albert Earl Cranston
BY Darby & Darby
ATTORNEYS

April 7, 1931. A. E. CRANSTON 1,799,958
METHOD OF AND APPARATUS FOR MAKING COMPOSITE LUMBER
Filed Feb. 26, 1927 20 Sheets-Sheet 18
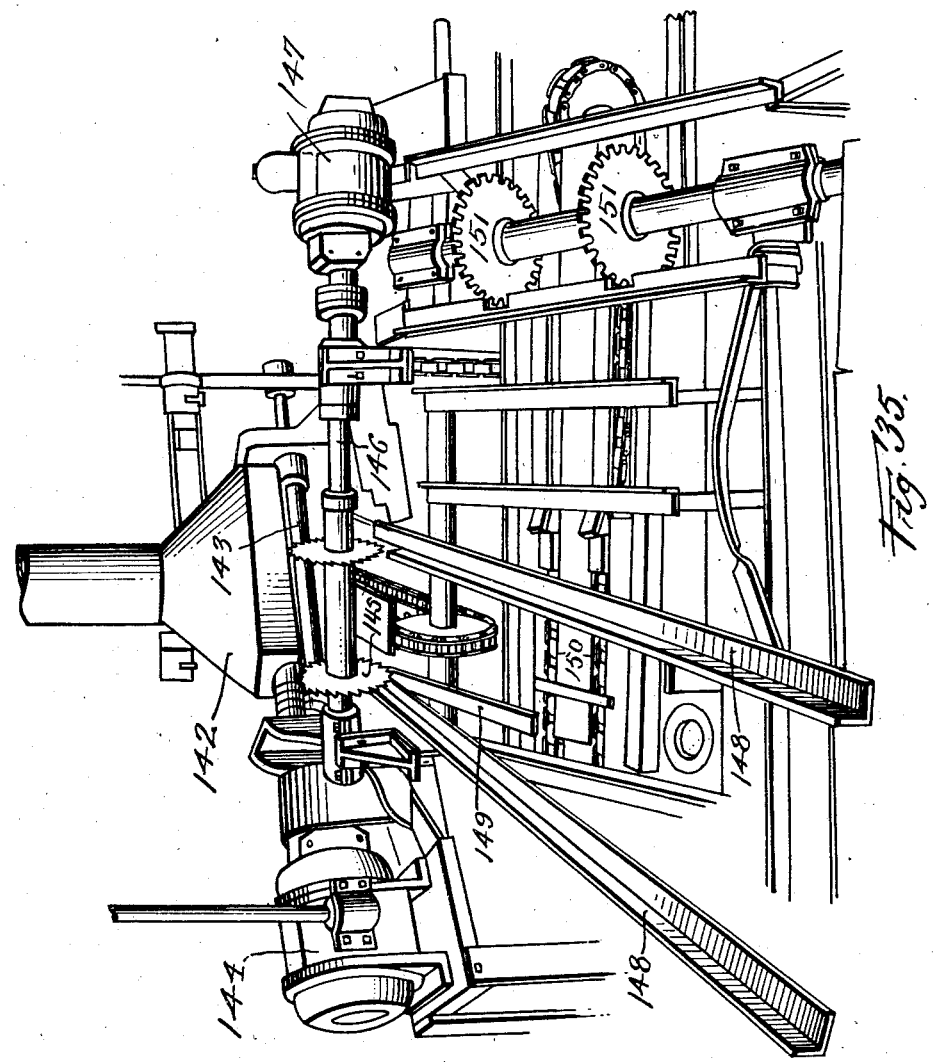

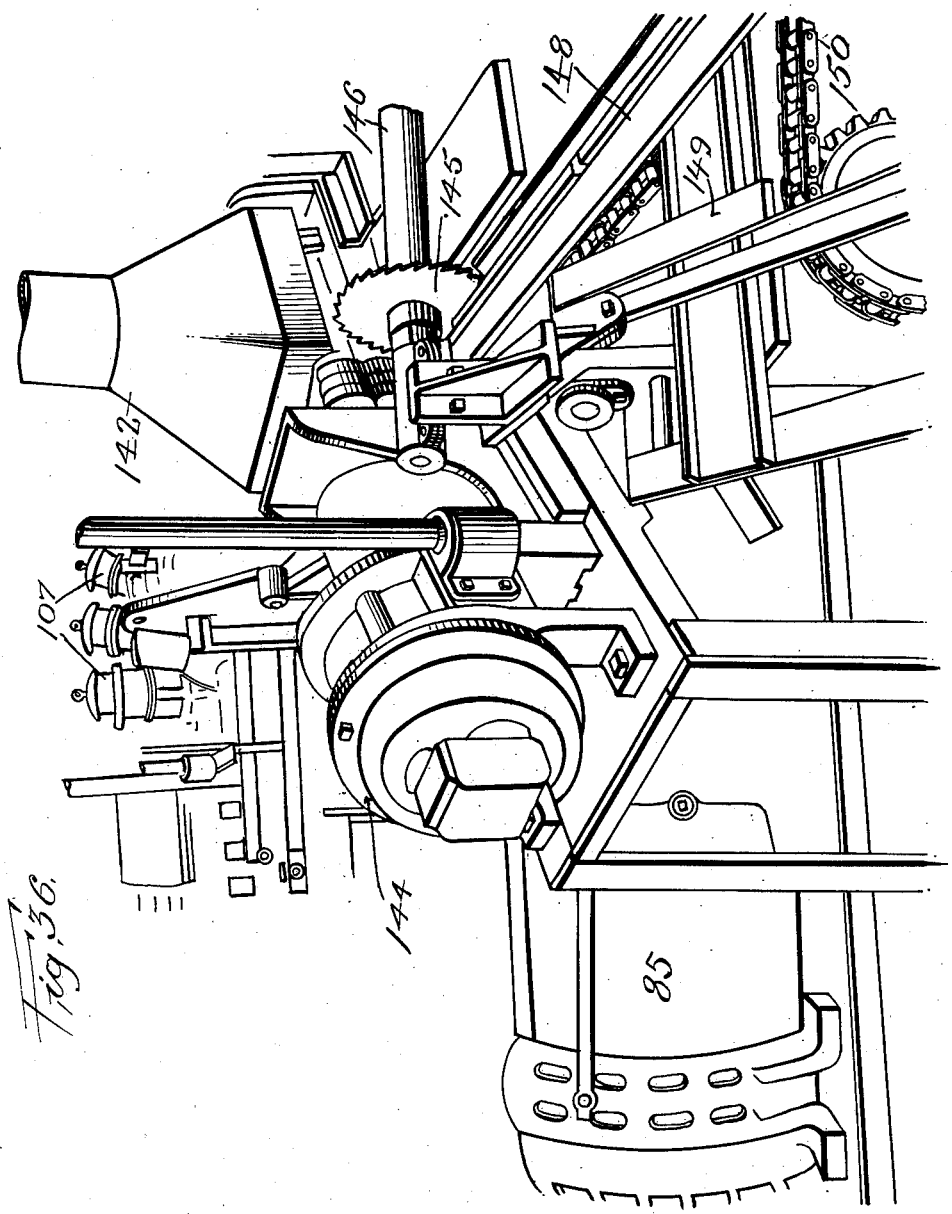

Patented Apr. 7, 1931

1,799,958

UNITED STATES PATENT OFFICE

ALBERT EARL CRANSTON, OF SPOKANE, WASHINGTON

METHOD OF AND APPARATUS FOR MAKING COMPOSITE LUMBER

Application filed February 26, 1927. Serial No. 171,146.

This invention relates to a method of and apparatus for making composite lumber and, more particularly to a method of and apparatus for utilizing the waste material, slabs, boards, rejects, mill ends, and the like which ordinarily accumulate in the operation of lumber mills, or mills engaged in the manufacture, or in the use, of lumber.

The object of the invention is to provide a method and an apparatus which is simple and efficient, for utilizing slabs, boards, pieces, rejects and mill ends, generally, which comprise the waste accumulations at lumber manufacturing mills, using lumber, factories, wood working or like establishments.

A further object of the invention is to provide an apparatus and method of the nature referred to in which pieces of lumber or waste material are assembled and secured together in the production of composite lumber, capable of use for various purposes.

A further object of the invention is to provide an apparatus and method of the nature and character referred to wherein pieces of boards, lumber, mill ends and the like, are assembled together in groups of uniform dimensions to constitute usable lumber products in the manufacture of various articles of commerce, such as box ends, panels, doors, boards, chair bottoms, table tops and the like.

A further object of the invention is to provide an apparatus and method of the nature referred to wherein pieces of lumber, boards, slabs, rejects, mill ends or the like, of indiscriminate width, are assembled together into groups of uniform width and thickness, and bound or secured together by suitable engagement therewith of retaining or binder strips through interlocking connections. The feeding or progression of the material or stock in group assembly, the reduction to uniform length and width of each successive group, the construction and application thereto of interlocking retaining or securing strips, and the reduction of the assembled groups to uniform thicknesses, and other operations required in the production of a composite lumber product, all being accomplished automatically, and the finished product delivered from the apparatus in the form in which the same may be utilized in the manufacture of various commercial products, all in continuous sequence of operation and without interrupting the continuous feed or progression of the group assembly.

Other objects of the invention will appear more fully hereinafter.

The invention consists substantially in the construction, combination, location and relative cooperative arrangement of parts, and method of operation, all as will be more fully hereinafter set forth, as illustrated in the accompanying drawings and finally pointed out in the appended claims.

In the accompanying drawings:

Fig. 2 is a view in vertical transverse section on the line 2—2, Fig. 1, looking in the direction of the arrows.

Fig. 3 is a top plan view of the stock receiving hopper and devices to successively eject the group assemblies therefrom.

Fig. 4 is a view in rear end elevation of the structure shown in Fig. 3.

Fig. 5 is a view in front end elevation of the same.

Fig. 6 is a view slightly in perspective of the right hand side of the receiving end of the machine showing more particularly the driving mechanism for initially feeding a group of the stock pieces to be operated upon onto the receiving end of the machine.

Fig. 7 is a view slightly in perspective taken from the left hand side of the receiving end of the machine.

Fig. 8 is a broken detail view in section on the line 8—8 of Fig. 7.

Fig. 10 is a view similar to Fig. 2, parts being broken off the line of section being nearer to the receiving end of the machine, and showing in elevation the laterally adjustable assembly group presser devices.

Fig. 11 is a detail view in transverse section of one of the group assembly laterally movable feed rolls.

Fig. 12 is a view slightly in perspective looking towards the left hand side of the machine, at a portion beyond the receiving end, and showing the devices for preparing the ends of the individual members or units composing a group of assembled boards or pieces, to receive the interlocking binder strips therefor.

Fig. 13 is a detail view in transverse section showing a portion of the apparatus employed to prepare the ends of the boards for the reception of the binding strips or cleats, and illustrating the method of adjusting the apparatus, and for securing and holding the boards or pieces while being operated on thereby.

Fig. 14 is a detail view in vertical plan looking downwardly from the plane indicated by the line 14, 14, Fig. 13 showing a portion of the adjusting mechanism for the grooving cutters.

Fig. 15 is a view in side elevation looking towards the right hand side of Fig. 13.

Fig. 16 is a detail view in section on the line 16, 16, Fig. 13 looking in the direction of the arrows, and showing means for laterally adjusting the grooving cutters.

Fig. 17 is a detail view in section taken lengthwise of a unit member of a group of boards illustrating the operation of grooving the ends thereof to receive a retaining binder strip or cleat.

Fig. 18 is a view slightly in perspective of that portion of the apparatus shown in Fig. 12, looking from a point nearer the receiving end of the machine.

Fig. 20 is a top plan view of the structure shown in Fig. 19, showing the structure more in detail.

Fig. 21 is a view in elevation of the structure shown in Fig. 20.

Fig. 22 is a broken detail view in top plan showing portions of the frame upon which the cleats are delivered from the glue applying devices preparatory to being fed into position to be applied to the ends of the group assemblies.

Fig. 23 is a broken detail view in vertical section on the line 23, 23, Fig. 19, looking in the direction of the arrows.

Fig. 24 is a broken detail view in section on the line 24, 24, Fig. 20 looking in the direction of the arrows.

Fig. 25 is a broken detail view in vertical transverse section illustrating the manner of delivery and application of the cleats to the group assemblies.

Fig. 26 is a view similar to Fig. 25, somewhat enlarged, showing the operation of assembling the retaining and securing strips or cleats with a group of boards.

Fig. 27 is a detached detail view in side view of a device for engaging the tongue of the cleats when the latter is in position to be assembled with a group of boards.

Fig. 28 is an end view of the same.

Fig. 29 shows details of the mounting of the cleat tongue engaging rollers.

Fig. 30 is a detail view in rear elevation of a floating stop mechanism for the arrest of the binder cleats while being assembled without arresting the continuous feed of the group of boards.

Fig. 31 is a view in side elevation of the same on the line 31, 31, Fig. 30.

Fig. 32 is a top plan of the same.

Fig. 33 is a view in general assembly, and somewhat in perspective of the side of that portion of the machine in which the composite lumber product is sized in the dimension lengthwise of the component members of the board and as to thickness, and in which sizing operation the nailing cleats are produced.

Fig. 35 is a view of the same part of the machine as that shown in Fig. 26, looking from the delivery end of the machine.

Fig. 36 is a view somewhat in perspective similar to Fig. 35, looking from a different point of view and showing the location and arrangement of the main driving motor for the machine.

Fig. 37 is a view in diagram showing the electric circuits for controlling the various motors employed in the machine.

Fig. 38 is a detail view showing a portion of the driving mechanism.

Fig. 39 is a detached detail view in perspective showing a completed composite lumber product produced upon the apparatus and indicating the manner of sizing the same and producing the nailing cleats.

Figs. 40 and 41 are detailed views of forms of stop devices for the cleats, embodying the principles of my invention.

Fig. 42 is an enlarged detail view of the apparatus for applying glue to the grooves.

The same part is designated by the same reference numeral wherever it occurs throughout the several views.

Figure 1:
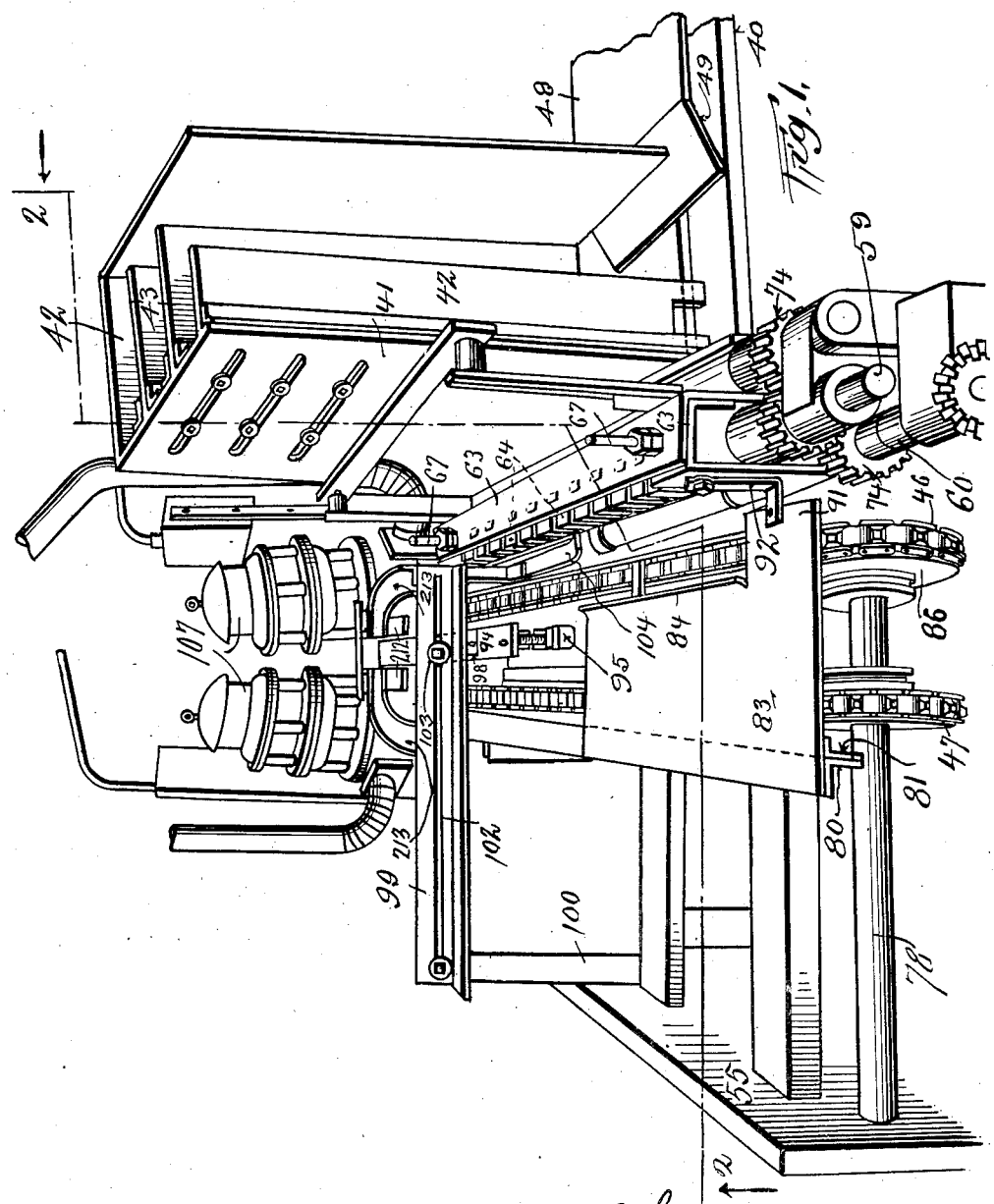
Figure 1 is a view, slightly in perspective of the stock group receiving end of the machine.

In mills for the manufacture of lumber, as well as in plants where manufactured lumber is utilized in the construction of various articles of commerce, a very large percentage of usable material is wasted and lost. In the case of lumber mills where lumber is manufactured or produced from the bodies of trees, the waste of material referred to is occasioned in various ways in the lumber manufacturing operations. Usually, from the rough logs, slabs are cut to remove the sides thereof so as to reduce the body of the log ordinarily to a square or rectangular piece constituting the central portion of the original log. The slabs produced by this sizing and preparing operation contain a very appreciable amount of usable material which has heretofore been thrown away because of the cost of obtaining the usable parts therefrom, the lack of demand for the same in the rough form, and for other reasons. The waste of valuable lumber material from this cause amounts to from 10% to 20% of the original log. Again, in reducing the part of the log, left after the removal of the side slabs, to proper lumber dimensions, as well as in various other ways, another serious loss of valuable material results. Knots occurring in the length of the lumber to be produced, frequently result in rejection of the piece, or a large portion of it. Also, in reducing the lumber to a standard length the severed end portions, sometimes of considerable length constitute a source of waste and loss. From these and other sources of waste it frequently happens that the good lumber output from the lumber mill is considerably less than 50% of the original log. This means an initial loss and waste in the mill operation of more than 50% of valuable lumber material. Not only is this waste a loss of good material, but the constant accumulation of such waste material adds very materially and substantially to the cost of operation of the mill, since such waste material, slabs, rejects, mill ends, and the like is of continued accumulation, occupies considerable space, and must be gotten rid of. This waste material, under present operating conditions of lumber mills, is not a saleable product even for kindling wood, to any appreciable extent. The result is that practically all mills are required to install and operate incinerators or furnaces in which this waste material is burned. The cost of installation of such incinerating devices, their up-keep, care and operation, adds to the expense of operation of the mill, and hence increases the cost of production of the good lumber product as an output of the mill. The same conditions of waste of good lumber material, also occur, to a considerable extent, in factories or plants where the lumber products of the lumber mills are manufactured into articles of commerce, and in various ways well known to the manufacturers.

It is among the primary purposes of my present invention to utilize this heretofore waste material in the production of usable products for which there is a ready market and demand, thereby turning to profitable account what has heretofore been a source of waste and serious loss.

In carrying out my invention, it is my purpose to reduce the waste material from lumber mills, lumber factories, and the like to comparatively short lengths, or to lengths within the dimensions of usable products to be made therefrom, as well as within the limits of the available waste material, and to assemble such reduced portions of the waste material into boards, panels, and the like in the form of composite lumber or similar products for use in various industrial lines, in the form of panels, boards or other types and characters of composite lumber.

In accordance with my invention the separate pieces recovered from the mill and factory waste material, are reduced to substantially uniform lengths irrespective of their relative widths, and, if desired, though not necessarily, to substantially uniform thicknesses. They are then assembled in groups somewhat greater in dimensions than the finished product to be produced. These pieces, so assembled are fed in successive group arrangement into the machine where units composing each group are if necessary reduced to uniform dimensions as to length and thickness, and are bound or secured together, in a group assembly, by application thereto of binder strips, and the group reduced to the required width, to form the product, whether a panel, a composite board, a box end or other desired product.

In preparing the individual pieces composing a group assembly to be secured together into the final product, I propose in accordance with my invention, to apply to the ends of such assembled units suitable retaining cleats or binders which engage the respective ends of all of the unit pieces of the assembly, in such manner as to hold and maintain them in their compact grouped relation. One satisfactory and efficient way to effect the securing together of the various pieces into an assembly, which is contemplated in my invention, is to provide the securing cleats or binders, and the adjacent ends of the lumber pieces to be engaged and secured together, with inter-engaging tongues and grooves. In one manner of accomplishing this result, as disclosed and to be hereinafter described, but to which I do not desire to be limited or restricted, each end of each of the individual pieces of a group assembly is formed with an undercut or dovetailed groove, while the binder or cleat is formed with a complemental undercut or dovetailed tongue. It will be obvious, of course, that the groove may be formed in the cleat or binder while the engaging tongue may be formed on the ends of the units forming the assembly. For practical reasons, however, I prefer to groove the units and tongue the cleats. In practice, I find it advisable to employ binders or side cleats of a length to engage the ends of all of the unit members of the assembly, it being understood, of course, that such a binder or cleat is to be applied to both ends of the units of the assembled group. I also find it desirable to dispose the grain of the binders or cleats in a different direction with respect to that of the grain of the pieces or units composing the group assembly. This result may be attained by disposing the binders or cleats with their grain running lengthwise thereof, at the ends of the units of the group assembly in transverse relation to the lengths of said units with their grains running lengthwise. It is to be understood, of course, that in these various respects and details I am not to be limited or restricted, as variations therefrom would readily occur to persons skilled in the art without departure from the spirit and scope of my invention which resides more particularly, in the mode of operation and structure of mechanism for carrying out these various operations, and for producing a composite lumber product of the nature and character referred to.

If found desirable, and in order to insure a more efficient binding together of the units of the group assemblies, the engaging surfaces of the tongues and grooves may have a suitable adhesive, such as glue, applied thereto before or while being applied the one to the other. In carrying out this feature of my invention, I have found it convenient and effective to feed the grouped assembly of units to compose a product in a direction laterally with respect to the lengths of the units composing such assembly, so as to enable said units to be efficiently positioned with relation to each other, with respect to their lengths, and to be reduced to uniform lengths, and to position and retain the binders or cleats in the line of feed or progression of the ends of the assembled units, so that the inter-engaging tongue and groove of the cleats and unit members of the grouped assembly may enter and telescope lengthwise with respect to each other, the one into or upon the other, as the grouped assembly is continuously progressed through the machine.

Of course the binder or cleat strips are suitably prepared and cut to a desired or required length and dimension to correspond in length, substantially to the width dimension of the grouped assemblies to the ends of the units of which they are to be applied, said binders are fed or progressed, independently and without interruption of the continuous feed of progression of the group assemblies, into position for the inter-engaging of the tongue and grooves to be effected. The application of the glue material thereto, or to the engaging surfaces thereof, if desired, is effected while said groups and binder strips are fed as above stated, and in such manner as will be hereinafter more fully explained, that the insertion longitudinally of the tongues of the cleats into the grooves of the units of the assemblies will serve to distribute the glue material along the surfaces thereof.

After the binder strips or cleats have been applied to the respective ends of the units composing a group assembly of board or lumber pieces, so as to bind and secure such units into the desired composite lumber product, the assembled units and side binders or cleats are then progressed onwardly through the machine as a unit and are reduced to the desired uniform and corresponding thickness and the finished product to the desired width.

It is frequently desirable, particularly in the use of a composite lumber product employed as the end wall of a packing or shipping box or crate for fruit, vegetables or other products of commerce, and called, usually, box ends, to provide strips which are to be nailed or otherwise applied to and secured upon the edges of the box and when assembled into a box or case, so that when the boxes or cases are stacked or piled the one upon the top of the other, they will be slightly offset or raised, the one from the other, whereby the contact of one box resting upon another, is taken mainly at the ends of the boxes where the box ends are located, which, ordinarily, is the strongest part of the box. My invention contemplates the production of spacer or nailing strips of this nature, and therefore, in accordance with my invention, I provide means to produce uniform lengths and dimensions of spacer or nailing strips. This, I accomplish by employing binders or cleats, above referred to, of such initial dimension or thickness as to permit the spacer strips to be ripped therefrom by edging saws, or other devices, after such binders or cleats have been applied to the grouped assembly of units, and in the operation of sizing the length dimension of the completed composite lumber product. In this way, I am enabled to produce the spacer strips in uniform and corresponding dimensions while effecting the proper edging or sizing of the composite lumber product, and during the continuous passage of the grouped assembly through the machine. Either before or after the sizing to length of the composite lumber product, and the production of the spacer strips above referred to, the composite lumber product is sized as to transverse width, I propose to provide means in the machine for accomplishing this result so that there will be delivered from the machine the completed composite lumber product or structure ready for the market and for utilization for the purpose for which it may be intended, and of standard uniform dimensions, although I contemplate employing suitable adjustments to enable the machine to turn out composite lumber products of any desired dimensioning.

From the foregoing it will be seen that my invention comprises first, the reduction to roughly uniform lengths, of pieces of waste material from lumber mills, lumber manufacturing plants and the like, and the assembling of the same in group assemblies, whatever may be the relative widths of the individual pieces composing a group, feeding each grouped assembly as a group, first in a direction endwise, with respect to the individual units of the group, onto a continuously operating carrier mechanism which receives the units comprising the group assembly transversely thereacross and by which the grouped assembly is continuously fed forwardly in a direction transversely to the lengths of the units composing the same, and in grouped formation, so as to be evenly assembled with respect to their lengths, past devices for fashioning their ends to receive the interlocking binders or cleats, and efficiently holding and maintaining the units of each assembly in group formation while being so progressed and the ends thereof fashioned. Also in forming the binders or cleats in roughly uniform dimensions as to thickness, width and length, and fashioned along one edge thereof complementally to the fashioning of the ends of the units composing the group assemblies, to enable them to accomplish their functions of binding together the units of the group assembly, and feeding such binders or strips into proper position with respect to the line of progression of the unit assemblies so as to become interlocked with the ends of the pieces or units composing the grouped assembly. And, where desired, applying glue material to the surfaces of the inter-engaging and interlocking portions of the pieces of lumber and the end binders or cleats. I also provide means for efficiently holding and maintaining in proper position and relation, the units of the group assembly, as well as the side cleats or binders while being interlocked or engaged together. I also provide means for surfacing the top or bottom surface, or both if desired, of the assembled group, with binders or cleats applied thereto, while such assembly is being continuously progressed as a unit through the machine, and I also provide mechanism to size the assembled product in the direction of the length of the units or pieces composing the assembly, which mechanism, in the illustrative form shown, comprises ripping saws which serve as edgers to rip the outer edge portions of the binders or cleats, thereby performing the double function of reducing the completed product to the required length dimension, while at the same time producing the spacer strips I have heretofore referred to; and finally, I provide means for trimming the edges of the assembled product to reduce the same to the desired width, and means for delivering the finished product. All of these various operations are co-ordinated together to work in harmony with each other to economically produce the final finished product, in utilization of the vast waste material from lumber mills, lumber factories and the like, thus turning to useful account in the production of useful salable composite lumber products, and at remarkably small cost, the waste material heretofore thrown away and burned up.

In the accompanying drawings, I have shown a structure of machine which I have found efficient for successfully carrying out the various operations required and hereinabove referred to, and, while I have shown and will now describe in detail the structure, arrangement and co-ordinated operation of the various devices comprising the machine, it is to be understood that various modifications and changes in details of the structure and arrangement would readily occur to persons skilled in the art, without departure from the spirit and scope of my invention. I do not desire, therefore, to be limited or restricted to the exact details of structure shown and now to be described.

Referring to Fig. 39, I have shown a composite lumber product in the form in which it is produced and delivered by the machine, consisting of the individual wood pieces A, which are formed in their end surfaces, in this instance, with dovetailed grooves indicated at B. These unit pieces A are assembled initially side by side without regard to their relative widths or, within limits, without regard to their relative thicknesses. The binders or cleats are indicated at C. These are provided with dovetailed tongues D, along one side edge thereof, which tongues are complemental to the grooves B, and interlock therewith, the binders or cleats C, being disposed at the ends of the pieces A, and in transverse relation with respect thereto, and E, designates the spacer strips which are ripped from the outer edges or sides of the binders or cleats C, in the operation of reducing to uniform length dimension the assembled composite lumber product.

The mode of operation and machine now to be described, as above indicated generally in the co-ordinated and co-operative action of the various steps and mechanism referred to, results in the production of the finished commercial product illustrated in Fig. 39, and above described. It will be understood that the graining of the pieces A, ordinarily runs in the direction of the lengths of said pieces; and the same is true with respect to the graining of the binders or cleats C, so that in their assembled relation the grain of the pieces A, and that of the cleats or binders C, are in transverse relation with respect to each other. This I have found desirable as a more substantial, stronger and efficient composite lumber product is thereby produced, while the danger of splitting is avoided when nails are driven through the cleats into the ends of the boards.

The pieces of lumber A, produced from the waste of the saw mill or factory are assembled upon a table 40 at the receiving end of the machine, positioned, in this instance, at the right hand side of the machine, and are stacked or piled in superposed layers in a hopper arrangement comprising the front and side wall portions 41, 42.

Each layer of strips A, is composed of a sufficient number of individual pieces placed side by side to constitute a group assembly to form the finished composite lumber products to be turned out by the machine. I have found it preferable to form the hopper into two or more compartments each compartment adapted to receive successive layers, each layer consisting of one or more boards or pieces of lumber. To this end, I mount separating or division plates 43, for lateral adjustment, upon the end wall 41 of the hopper. Slots in said end wall afford means for laterally adjusting the plates 43. In this manner, I find that I can more rapidly and efficiently assemble the individual units of the successive groups into the hopper. A group of pieces A, constituting the lowermost layer is fed from the hopper in the direction of the length of the units of said group along the table 40, between a system of feed rollers 44, 45 transversely across the machine, at the receiving end of the latter, and upon carriers 46, 47, which are shown, in this instance, as endless chains or sprockets, and are continuously driven to operate longitudinally of the machine to continuously progress or carry the assembly of pieces A, as a group, in a direction transversely to the length of the latter, and through the machine, for the various operations herein before referred to, to be performed thereon. The feeding of the groups of pieces A, as groups successively from table 40 onto the carriers 46, 47, may be accomplished in various ways. I have shown a simple arrangement wherein a pusher member 48, is mounted to slide back and forth upon the table 40, toward and from the feed rollers 44, 45. This pusher member 48 is disposed so that its front edge simultaneously engages behind the rear ends of all the pieces A, constituting the lowermost group, as indicated in Fig. 2, and when moved towards the feed rollers 44, 45 serves to push or eject the layer of preliminary assembled pieces A, constituting such lowermost group, in the direction of the lengths of the latter from the hopper, so as to engage their advancing ends between the rollers 44, 45. Where a stack or file of successive layers or assemblies of pieces A, is supported upon the table 40, the pusher member 48 effects the projection of only the lowermost layer or group of said pieces A, and in order to avoid undue interference on account of the superposed layers, the front end of the pusher member 40 is bent or curved as indicated at 49, thereby serving to slightly wedge in between the group assembly A to be projected thereby and the next adjacent upper layer or group assembly of pieces A'. The pusher member 48 may be actuated in many specifically different ways. I have shown a simple arrangement, as illustrative of the principles of my invention, where a pitman 50, is connected at one end, as at 51, to the pusher member 48, or to a stud having connection with said pusher member, and is eccentrically pivoted at its other end to a disc 52, carried by a shaft 53, mounted in brackets 54, secured to the side frame member 55, of the machine. Rotation is imparted to shaft 53, in any suitable manner, as, for example, through gearing 56 from a shaft 57, which is driven from any convenient drive shaft of the machine, such as the shaft 78, which carries the sprocket gears 86, 87, over which operate the feed sprockets 46, 47, through suitable intermediate connections, such as sprocket chain 211, see Fig. 2. When the pusher member 48 is actuated to advance an assembled group of pieces A, in case the hopper arrangement contains other group assemblies piled upon the lowermost one, such other grouped assemblies are restrained from being advanced with the lowermost group by the front wall portion 41 of the hopper, the delivered group being projected through a slot or opening at the lower edge of the hopper plate 41, as clearly shown in Fig. 2.

I have shown the hopper in which the groups of units or pieces A are preliminarily placed, as having the relatively adjustable division plates or partitions 43, as above described, mounted for lateral adjustment by means of bolts in slots 44[a] in the front end wall 41 of the hopper. By this means the assembling of the units A, in layer or group formation in the hopper is greatly facilitated, and the danger is avoided of adjacent pieces or units of a layer or group becoming overlapped at their edges thereby interfering with their proper feed in group formation from the hopper. The division plates or partitions 43 form individual compartments in each of which may be stocked or piled a number of pieces or units according to their widths. The lower ends or edges of the division plates terminate at a sufficient height above the table 40, to permit the lowermost layer or group of pieces or units to be fed in group formation from the hopper.

If desired the units composing a group assembly may be pushed or crowded compactly together edgewise while being fed from the hopper to the feed rolls 44, 45. This result can be accomplished in various ways. I have shown a simple arrangement, see Fig. 3, wherein a laterally operating pusher member 204, is provided and is actuated, as each group assembly is advanced by the pusher 48, to engage the outer edge of the outermost unit member of the lowermost hopper group to push or crowd the members of the group laterally against each other into compact relation and against the side wall 42. In order to accommodate variations in the transverse width of the individual units composing a group, the pusher 204 is mounted to yield slightly when advanced against the edge of the outermost unit. This is accomplished in the illustrative arrangement shown, by interposing a compression spring 205, between said pusher and the means by which it is advanced. In order to co-ordinate the operation of the pusher with that of the group feed member, 48, I propose to employ the advancing movement of said feed member to actuate the pusher 204. This can be accomplished in various ways. A simple and efficient arrangement is shown wherein the pusher 204 is actuated in its working movement by means of a rock lever 206, to which is connected a cam plate 207, arranged to be engaged by the feed plate 48, or a stud 207ª carried thereby, when said feed plate is moved forward to eject a group of pieces or units A from the hopper. The rocking movement of lever 206 is resisted by a spring 209, which returns said lever and the pusher 204 to initial position when the ejector or feed plate 48 is returned to its initial position ready to repeat its ejecting or feeding action on the next succeeding group of units A.

If desired, the side wall 42 of the hopper may be adjustable so as to accommodate the hopper to various widths of group assemblies. A slotted securing bracket 210 is shown for adjusting said side wall and securing it in adjusted position.

The rollers 44, 45 between which the group of pieces A are forced endwise by the pusher 48 are respectively mounted upon shafts 59, 60. However, in order to adapt the rollers 44, 45 to any unevenness in the thickness of the pieces or units A composing a group, instead of said rollers being solid rollers, they are or at least one of them is made in sections which, in the example shown, are strung upon the upper shaft 59, each roller section being floatingly mounted upon shaft 59 for movement transversely with respect thereto, but splined or keyed to rotate with said shaft as clearly shown in Figs. 2, 10 and 11, the roller sections having an enlarged bore indicated at 61, and the keys or splines being shown at 62, in Fig. 11. The roller shafts 59, 60 are journaled in boxes within a bracket or frame 63 from the top bar of which are suspended bearing blocks 64 arranged to bear respectively on the roller segments of the upper shaft 59, the bearing blocks 64 being spring pressed against their associated roller sections by means of a spring 65, see Fig. 2 mounted upon a stud 66, upon which the bearing block 64, is loosely mounted, the spring 65 being interposed between the upper side of the bearing block 64, and the under side of the top bar of the bracket 63. Means are provided for suitably adjusting the roller shafts 59, 60, vertically towards and from each other. This can be accomplished in various ways. Adjusting screws 67 are shown for this purpose, see Fig. 1. The roller shafts 59, 60, may be positively driven in any suitable or convenient manner. A simple arrangement is shown wherein a gear 68, see Fig. 6, on a shaft 69, meshes with and drives a gear 70, on a vertically disposed shaft 71, journaled in suitable bearings carried by the frame work of the machine, and which carries a drive gear 72, at its upper end arranged to mesh with and drive a gear 73, on the lower roller shaft 60. The shaft 59 is driven from shaft 60 through the train of gears 74. The shaft 69 is suitably journaled in the frame work of the machine and may be driven from any driving shaft of the machine, and in any convenient manner. I have shown a simple arrangement wherein said shaft is driven through a sprocket chain 75, operating over sprocket gears 76, 77, respectively, on shafts 69 and shaft 78, the latter being arranged to extend transversely of the machine at the receiving end and carrying the sprocket chains 46, 47, in the particular arrangement shown, constituting a part of the feed mechanism for receiving and progressing the assembled groups of boards or pieces A through the machine, as will presently be more fully explained.

From the foregoing description, it will be seen that I provide a structure of positively driven sectional rollers which efficiently engage and grip the various units or pieces composing an assembled group of stock pieces, to aid in the delivery of the group in group formation, from the hopper onto the receiving end of the group feeding mechanism, and wherein the sections of the feed rollers are independently pressed into gripping engagement with the pieces composing the group, thereby permitting each roller section to independently yield to accommodate any unevenness in the thickness or relative thicknesses of the units composing the group while passing between the rollers. The roller sections, however, are positively rotated to aid in the delivery of the group onto the feeding devices by which the group is progressed through the machine. This is an important element of the mechanism, inasmuch as it enables me to utilize and handle in the machine waste pieces of lumber of varying thickness without the necessity for preliminary reducing the same to uniform thickness. This results in the utilization of indiscriminate portions of the waste material, mill ends, and the like and very greatly extends the range of utility, value and use of the machine.

It is important that the group of stock pieces A, be delivered in group formation into position over the conveyor sprocket chains 46, 47 in substantially uniform relation transversely across the line of feed of said sprocket chains and that all the members of such group be disposed in substantially the same horizontal plane. It is equally important to provide means to prevent any relative displacement of the individual units of the delivered group of boards or pieces A, which would cause adjacent units to lap, the one upon the edge of the other, or to tilt laterally while being so delivered. Moreover, the tendency of the sectional feed rollers 44, 45, as the rear ends of the units composing a group of boards A, leave said rollers, for deposit transversely across the feed sprockets, is to tilt the forward or advancing ends of said units. It is this tilting movement or action which tends to skew the units of the group and to displace them from uniform orderly arrangement squarely transversely across the line of feed of the sprocket chains. It is among the special purposes of my invention to provide means to prevent this action and to initially receive and maintain the group units in uniform relation and position for the action of the feed sprocket chains thereon. Various means may be provided for accomplishing this purpose. I have shown a simple arrangement, which I have found efficient in operation wherein I provide a pair of rails 79, arranged to extend longitudinally of the machine and which, in the particular illustrative arrangement shown are arranged respectively adjacent the feed sprocket chains 46, 47, as shown in Figs. 2, 10 and 13. The group of units A, are delivered from the feeding rollers 44, 45 into position transversely across the rails 79, so as to rest thereon and to be supported thereby. I also provide a longitudinally extending rail member 80, which affords an abutment against which the front or advancing ends of the unit members A, abut when delivered into position to be supported upon the rails 79. Associated with the abutment 80, is a ledge 81, see Fig. 10, upon which the ends of the unit members A, are received, and on which they rest. This ledge or supporting shoulder 81 may be in the form of a flange on an angle rail applied against the inner face of the abutment member 80, as clearly shown in Figs. 2 and 10. Supported at its side edge upon the abutment member 80, is a yielding retainer plate or apron 83, which extends across and over the position occupied by the group assembly of individual units A when initially delivered into position to be progressed through the machine. This apron or plate has its free edge which presents towards the feed rollers 44, 45, up-turned as indicated at 84, so as to facilitate the entrance of the advancing ends of the unit members A, of a group beneath said plate or apron 83, while being fed or progressed by the feed rollers. The apron or plate exerts more or less of a spring action upon the grouped units to maintain them in proper position relatively to each other, and to prevent relative displacement thereof.

After being delivered into receiving position, as above explained, the successive groups of assemblies of units A, are progressed through the machine for the required mechanical operations to be performed thereon. While being progressed it is essential that the various units of the group assemblies be maintained in uniform relation with respect to each other, with respect to the devices employed for the operations to be performed thereon, and with respect to the feeding devices therefor. Various types and forms of feeding mechanism may be employed for accomplishing this result. I have shown a simple illustrative structure for accomplishing the desired result, and one which I have found efficient for the purpose, wherein I employ feed devices in the form of endless sprocket chains 46, 47 which are suitably driven continuously while the machine is in operation, from the main power drive motor 85, see Fig. 36, located at the rear or delivery end of the machine. The endless sprocket chains 46, 47 operate over sprocket wheels 86, 87 mounted on shaft 78, at the front or receiving end of the machine. This shaft extends transversely across the machine and is journaled in suitable bearings in the side members 55, of the frame work of the machine. The sprockets 86, 87 are provided with hubs which fit upon and are suitably secured to shaft 78 to rotate therewith, but which may be adjusted upon said shaft, so as to bring the sprocket wheels 86, 87 closer together or farther apart to accommodate groups of units of any desired length. This is an important feature of my invention in that I am thereby enabled to operate on group assemblies of any desired lengths of units. Connecting the two sprocket chains 46, 47 at spaced intervals apart in the direction of their length, are members 88, see Fig. 9, which constitute pusher bars and which, in the operation of the sprocket chains, 46, 47, engage against the rear edge of the outer or rear unit of a group assembly of boards or pieces A, when disposed in position to be progressed or fed through the machine, as above explained. By reason of this pusher bar engaging the edge of said outer unit throughout a large part of the length of such edge, the feed or progression of the entire group in uniform relation is assured. By this means the successive groups, in spaced apart relation with respect to each other, are continuously progressed or fed in grouped assemblies through the machine in continuous sequence.

Figure 9:
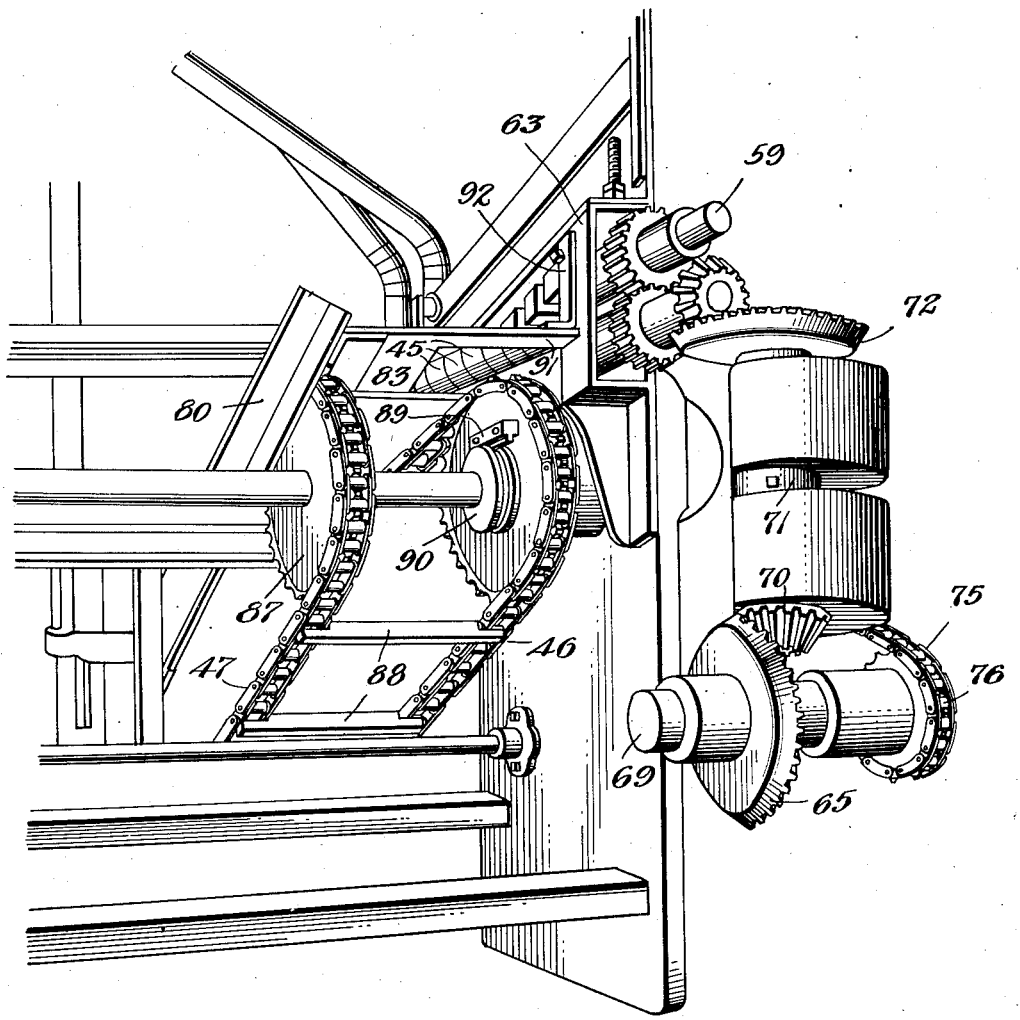
Fig. 9 is a broken view, somewhat in perspective, looking upwardly and toward the right hand side of the machine from a point beneath the receiving end of the machine.

In order to properly guide the sprocket chains 46, 47 while passing around the sprocket gears 86, 87, said sprocket chains are shown provided with bearing blocks or members 89, see Figs. 2 and 9, which ride over and are guided by a grooved drum 90, connected to or associated with said sprocket gears.

If desired, any suitable means may be provided for supporting the apron or plate 83 at its inner side edge. A simple arrangement for accomplishing this purpose is shown wherein the rear end of the apron or plate is provided with an extension 91, see Figs. 1 and 9, and a bracket or plate 92, is secured to the frame 63 and to the extension 91 of the apron or plate.

As above indicated, it is important to maintain the group assemblies, and the individual unit members A of the group assemblies in efficient uniform relation to each other, and to hold them firmly in place while being progressed through the machine, and while the various operations thereon are being performed. Various arrangements of devices for accomplishing this purpose may be employed. I have shown a simple and efficient illustrative arrangement for the purpose wherein I mount a supporting plate 94, to extend longitudinally of the machine in position above, and in central relation with respect to the space between the group carrying runs or legs of the sprocket chains 46, 48, and I suspend suitable bearing devices arranged to press yieldingly upon the units of the grouped assemblies while being progressed through the machine. In accordance with my invention these bearing members are mounted for yielding movement, and are relatively displaceable, both vertically and laterally, so that, while performing their function of engaging and pressing the individual units A of the grouped assemblies firmly in position upon their supporting rails 79, while being shifted along said rails, said bearing members also adapt themselves to any irregularities or relative variations in the thicknesses of the units composing the grouped assemblies. To this end the yielding members 95, in the particular form shown, are hingedly connected together in the form of a flexible chain-like structure of separately movable elements. Each bearing block or member 95, is loosely mounted upon, or carried by a stud bolt 96, see Fig. 7 which is supported in the longitudinal bar 94. A spring 97 is interposed between the upper surface of each block or member 95, and the under surface of the supporting bar 94, said springs exerting their tension upon the blocks to yieldingly press the same downwardly upon the upper surfaces of the unit members of the grouped assemblies as the latter are progressed therebeneath. If desired, and in order to afford a range of adjustment both transversely of the machine as well as vertically, the supporting bar 94 is carried near its front end by a bracket 98 (see Fig. 10) which is supported upon a transversely extending plate 99 carried by standards 100, secured to the frame work of the machine. To secure the transverse and vertical adjustments above referred to, I have shown an arrangement consisting in this instance, of a vertical slot 101, in the supporting bar 98 and a horizontal slot 102 in the supporting bar or member 99. By this means the securing bolt 103, by which the bracket 98 is supported upon the bar 99, permits a transverse adjustment of the supporting bracket 98, as will be clearly understood and the slot 101 permits vertical adjustment of bracket 98. Of course, it will be understood that as many of the adjustable supporting brackets 98 as may be required will be employed. At its other end the supporting bar 94 is supported between the receiving ends of a pair of similar supporting bars 212, carried by frame members 213, see Figs. 1, 12 and 18.

As the grouped assemblies pass beneath the bearing members 95, it is important that their uniform relation with respect to each other be definitely and positively assured so that the unit members of such assemblies will be presented in proper uniform assembled relation to the first set of operating devices to operate thereon. Various means may be employed for accomplishing this result. I have shown one simple arrangement wherein a presser bar 104, see Fig. 1 is employed at the side of the path of and above the rear ends of the units A, while the latter are being progressed as a group through the machine. This bar has its receiving end slightly upturned so as to facilitate the entry of the ends of the unit members therebeneath so as to be firmly held down upon the rails 79. I also slightly incline the abutment wall 80, see Fig. 1, in the direction of its length so as to insure the proper alignment of the ends of the units A. By this arrangement the unit members of the group assembly are evened in the assembly in the direction of their lengths, and as thus adjusted, both in the direction of their lengths and also in the direction of their transverse width, the latter due to the positive lateral feed of said unit members by the feed sprockets against the friction resistance of the bearing blocks 95, the grouped assemblies are very effectively held and maintained in their grouped assembly relation while being progressed as a group through the machine. As shown the receiving end of the line of bearing blocks 95 is disposed in close relation to the rear edge of plate 83.

It is to be understood that while I have shown and described the structure of one set of flexible yielding retaining blocks or members 95, any desired number of such sets may be employed. In ordinary practice, where comparatively short unit members A, of group assemblies are operated on, a single set or line of said retaining devices will be sufficient. Where longer unit members of the grouped assemblies are employed, two or more of such sets may be employed without departure from the spirit and scope of my invention.

As I have before described the units A of a grouped assembly are to be interlocked at their ends with binder members C (see Fig. 39) and I have explained that the interlocking portions at the ends of the individual unit members A, and on the binder strip or cleat are complemental to each other. In order to illustrate a practical arrangement of apparatus for carrying out my invention, I have shown the unit members A, as having dovetailed grooves B formed in the end surfaces thereof which are complemental to dovetailed tongues D formed on the opposed longitudinal edge of the binder C. It is to be understood, however, that my invention is not to be limited in this respect as the grooves may be formed in the retaining cleat and the tongue at the ends of the individual units A. In the illustrative arrangement shown, where dovetailed grooves are formed in the end surfaces of the individual units A, I arrange the ends of said individual units in the group assemblies, to be continuously progressed or fed past suitable grooving cutters. These are shown, in this instance, as consisting of rotary saws or cutters 105, 106, where the grooves are of the dovetail variety, (see Figs. 18 and 17). In the illustrative arrangement shown, said cutters are arranged in two sets of pairs, the members of each pair being disposed at respectively opposite sides of the path of travel or progression of the unit assemblies, and I arrange the members of each pair in inclined relation with respect to the plane of travel or progression of the unit assemblies; and I arrange the inclination of one pair of cutters to be in opposite direction with respect to the corresponding members of the other pair of cutters. I wish it to be understood that my invention is not to be limited in this respect, as other forms of cutters may be employed having other or different arrangements or relations, the essential feature being the provision of cutters or devices for grooving whether the dovetail or other type, both ends of each unit member of each grouped assembly while being progressed or fed therepast.

In order to provide for grooving or forming the interlocking members at the ends of units A, of different thicknesses with the interlocking member positioned midway the width or vertical dimensions of the units and in uniform relation with respect to all the units of the successive groups, and also in order to vary the depth of the grooves or the length of the tenons, as the case may be, to be formed at the ends of the units, it is desirable to so mount the tools 105, 106 or the like, as to be capable not only of vertical and transverse adjustments, but also of angular adjustment with relation to the plane of feed of the units. In other words, in order to adapt the machine to various sizes and lengths and thicknesses and dimensions of units A, to be operated on, and to secure uniformity, whatever such variations may be, so as to enable the machine to handle all kinds and characters of units A, or to produce composite lumber products of varying dimensions, it is desirable to provide for the corresponding adjustments of said tools. As illustrative of a practical, simple and effective means for accomplishing this result, I have shown the tools, 105, 106 in the form of rotary saws, and I propose to drive or operate said tools in any suitable or convenient manner, and from any desired or convenient source of power. In the arrangement shown, I propose to employ electric motors indicated generally at 107, one for each cutting tool, said motors being controlled in their starting and stopping operation, and as to their speed, in any suitable, convenient and co-ordinated way. I also mount the frames 108 carrying said motors and tools so as to be capable of the adjustments referred to. In the illustrative arrangement shown, each frame 108, is supported at one side by brackets 109, attached at one end to the frame 108, and at the other end to a frame bar 214, see Fig. 13.

This affords an efficient support for the motor or tool frame 108 at each side of the machine.

The other side of the tool frame 108 is carried by a slide member 110, mounted to slide vertically in guideways formed in the vertical or upright side arms 111 of a bracket, the base of which is mounted to slide transversely in a bracket 112, mounted on a side member 55, of the machine frame. Any suitable means may be provided for vertically adjusting the slide plate 110. An adjusting screw rod 113, engaging an angle plate 117, secured to slide 110, is shown for effecting this adjustment. Likewise any suitable adjusting means may be provided for transversely adjusting the bracket, of which the arm 111, forms a part. An adjusting screw rod 114, is shown for this purpose, said screw rod working through a lug 115, see Figs. 13 and 15, connected to the brackets 112, which carries the arms 111.

I have described a mounting and adjustment for one of the cutter devices referred to, but as the same structure applies to each of the cutters, the description of one mounting will apply to all.

While the grouped assembly of units A, is being progressed past the tools 105, 106, it is important to rigidly hold the individual units of the group against relative displacement in their group assembly. To secure this result, I prefer to employ two lines of bearing blocks 215, corresponding in structure and formation to the bearing blocks 95, beneath which the grouped assembly of units are held.

After the interlocking member or portion is formed on the opposite ends of the units composing the group assembly of the units A, that is, after such grouped assembly has been progressed past the tools which effect the formation of the interlocking feature referred to, it may sometimes be desirable to apply glue or other adhesive to the surface of the interlocking or engaging portion, as formed, preparatory to the assembly therewith of the complemental engaging members or binder strips or cleats C. The result may be accomplished in many different ways. A simple arrangement is shown wherein I mount a tank or container 118 at each side of the machine adjacent to the path along which the grooved or tenoned ends of the units of the grouped assemblies are progressed, said containers adapted to contain a liquid glue or similar composition, which flows by gravity or otherwise, through a pipe or hose connection 119, see Fig. 19 for delivery to the surface of the tenon or groove as the case may be, indicated at B, Fig. 39, formed at the ends of said units. In practice the glue is applied to the bottom surface of the grooves. A drip tank or receptacle 120, if desired, may be positioned beneath the tank 118 to receive any drippings of surplus glue material that may drip from the point of application of the glue material to the tenons or grooves referred to. If desired, and in order to accommodate variations in thickness of the units A, said tanks may be hingedly mounted upon hinged axis indicated at 121, and held yieldingly in position by springs.

After passing the point of application of the glue material, the next stage of the operation is to assemble and interengage the group of units A, and the binder strips C, at the ends of the said units. Such assembly may be accomplished in various ways. According to my invention, I propose to feed or present the binder strips C, laterally into the path of progression of the assembled group of units A, in such relation thereto that the interlocking complemental groove and/or tenon of the one will align longitudinally with that of the other. To this end, the binder strips or cleats, with their complemental engaging portion formed along the longitudinal edges thereof are fed laterally into position for their complemental engaging portion to align longitudinally with the line of progression of the complemental interlocking engaging portion on the ends of the groups of units A, so that the one will telescope into or upon the other.

I will now describe a structure and arrangement for accomplishing this operation.

The binder strips or cleats C, are cut to the desired approximate dimension of thickness, width and length to correspond, respectively, and approximately to the thickness of the units A, composing a grouped assembly and corresponding in length to the combined transverse width of the assembled group of units A, and of a width, if desired, to form not only the permanent binding cleats for the composite board product to be produced, but also to supply the spacer or nailing strips E, to which I have already referred. Such preliminary preparation and construction of the cleats or binders including the formation thereon of the complemental interlocking tongue or groove D, see Fig. 39, may be accomplished in any suitable or desired arrangement of mechanism.

In the arrangement shown, I mount at each side of the machine a mechanism, shown in this instance as a tenoning mechanism to cut or form dovetail tenon D, along one longitudinal edge of the binders or cleats, which will be complemental to the dovetail grooves formed in the ends of the units of the group assemblies. As shown, this mechanism consists of sets of feed rolls 217, between which the individual strips are fed endwise in succession. Positioned above and below the path of travel of the strips are tenoning cutters 218 shaped to operate on the upper and lower surfaces of the strips near one longitudinal edge thereof to form the dovetail tenon D, thereon. While being fed by the feed rolls 217 and operated on by the tenoning cutters 218, (see Figs. 20, 21), and if desired, an edge cutter or saw 220 may be employed to trim off the outer edges of the strips. The feed rolls and tenoning and trimming cutters may be driven from any convenient source of driving power. I have shown an electric motor 221, see Fig. 37 for this purpose which drives shaft 221ª, (see Figs. 20 and 21) geared by belt or otherwise to the shafts 219 of the tenoning cutters to drive the latter in opposite directions. The feed rolls 217, likewise may be driven in any convenient way. In the arrangement shown, the shaft of one of said pairs of feed rolls is geared through sprocket chains 222, or otherwise, to a convenient rotating shaft of the mechanism employed to present the tenoned strips into position to be applied to the units of the group assembly. Through suitable gearing connections from said feed roll shaft the other feed roll shaft of the tenoning mechanism is driven.

While I have shown the tenoning mechanism incorporated as a part of the machine, and co-ordinated to work in unison therewith, it will, of course, be understood that my invention is not to be limited or restricted in this respect, as it is obvious that the binder strips or cleats may be prepared and tenoned by a separate machine and brought to the composite lumber making machine of my invention for assembly with and application to the groups of assembled units as herein described. It is convenient and desirable, however, to incorporate the tenoning mechanism into one unitary self contained and co-ordinated machine with the other features composing the entire machine, as thereby separate handling of the strips is avoided, and a more synchronous, uniform and continuous operation is secured.

Figure 19:
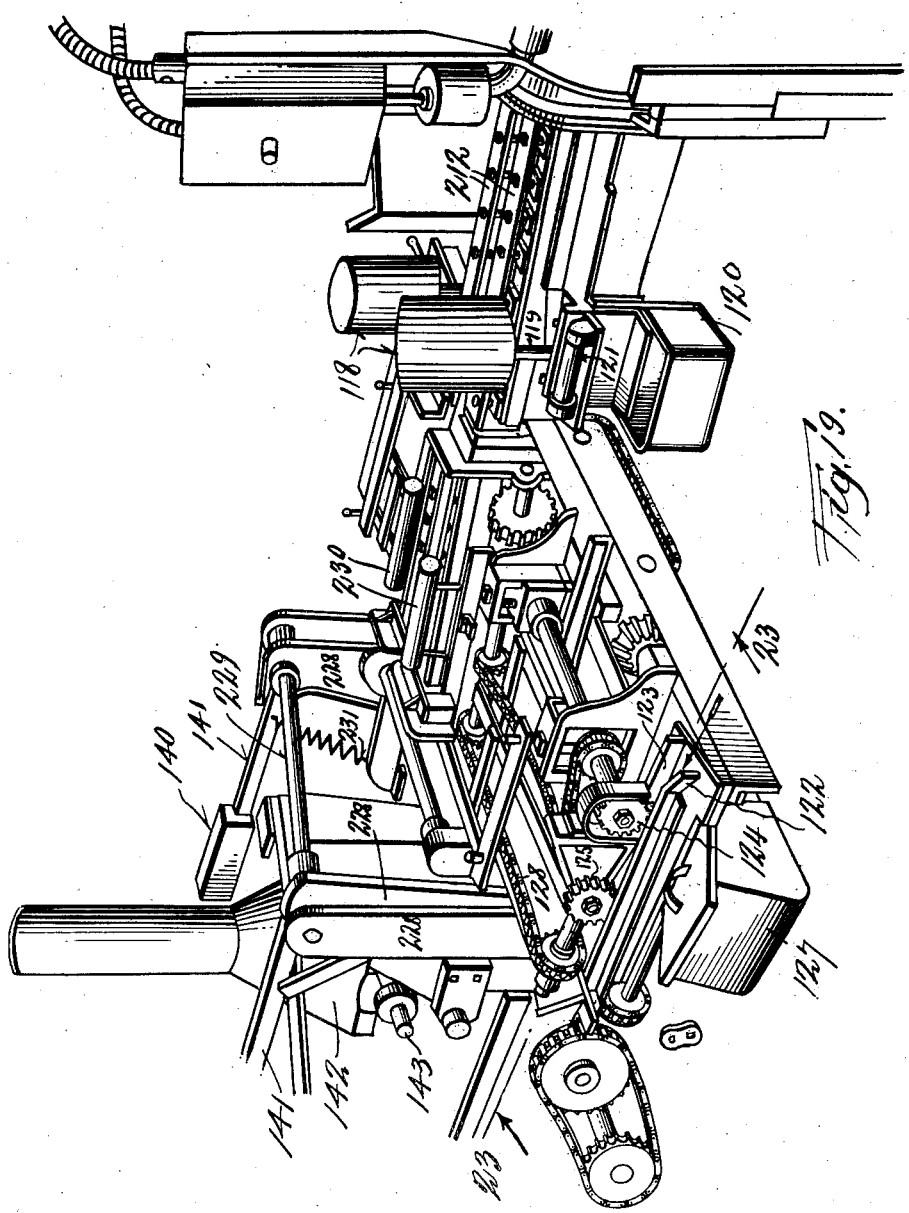
Fig. 19 is a view slightly in perspective showing the apparatus employed for feeding and assembling retainer or binder strips or cleats for the groups of board assemblies.
Figure 34:
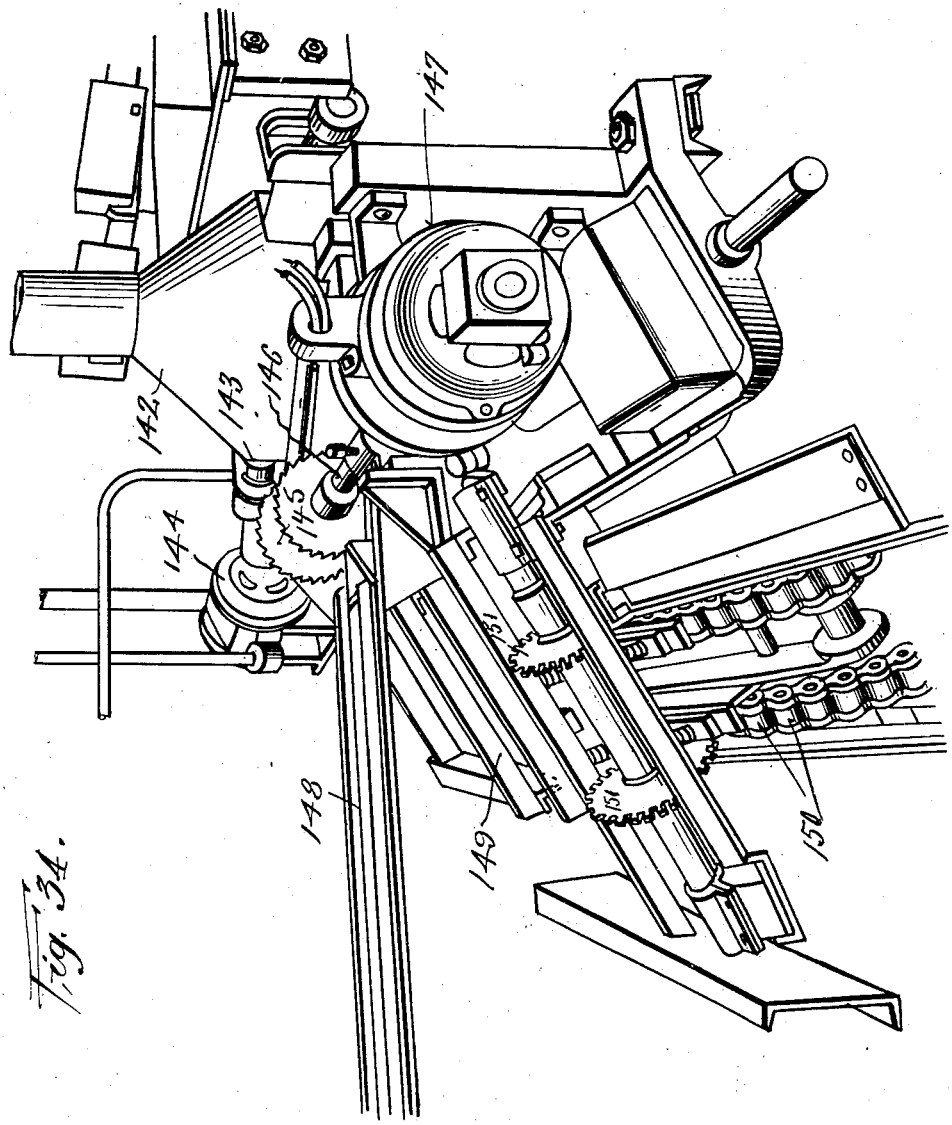
Fig. 34 is a view taken near the delivery end of the apparatus showing the transferring mechanism of the completed composite lumber product and the delivery of the nailing cleats respectively.
Figure 34:
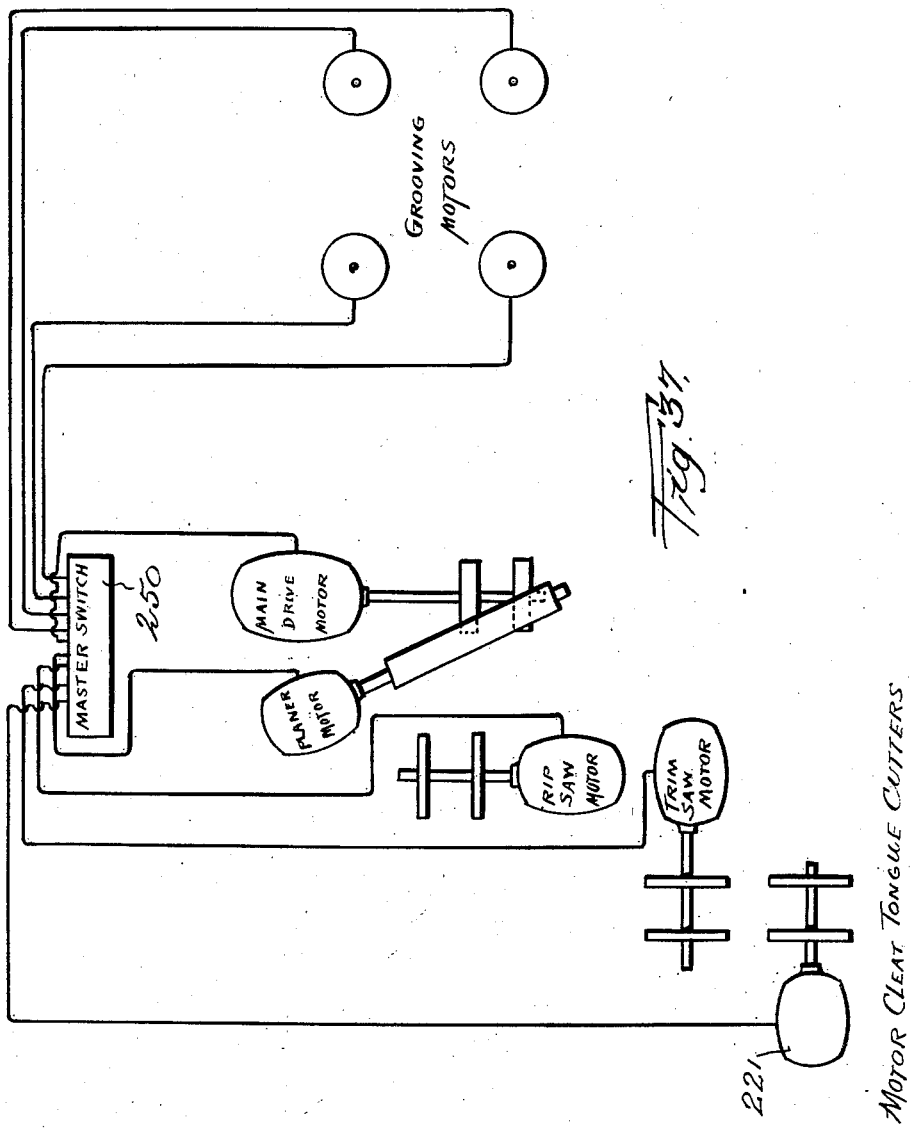

From the tenoning mechanism, where such mechanism is incorporated into the structure of the machine, or from any other source of fabrication of the tenoned binder cleats, or strips, said strips are presented singly and endwise between guide strips 122, 123, mounted upon a lateral extension of the frame of the machine, (see Fig. 19,) in which guideway said cleats or binder strips are fed longitudinally in the direction of the general length of the machine, and into position to be received upon conveyor devices which move them laterally, and successively in a direction transversely of the line of feed of progression of the assembled units A, and into position to be applied to such grouped assembly. Where a binder cleat is to be applied at both ends of the group or assembly of units A, a similar arrangement for tenoning, feeding and presenting the cleats is provided at each side of the machine. If desired, while the binder cleats are being fed as above indicated, an adhesive or glue material may be applied to the portion or surface thereof which is to be interengaged with the grooves in the ends of the grouped assembly of units. I have shown a simple arrangement for accomplishing this purpose, whereby the individual binder cleats are engaged from above by toothed feed rollers 124, 125, by which they are progressed along the guideway between the guide strips 122, 123. While being so fed or progressed a glue applying member 126 (see Figs. 21 and 23) operating in a receptacle 127, located beneath the path of travel of the strips, serves to apply glue to the lower surface of the complemental inter-engaging portion or tongue D, of such strips or cleats. The feeding rollers 124, 125, progress the strips into position to be engaged by laterally operating conveyors 128 and 129 (see Figs. 19, 23, 25 and 26), positioned and operating respectively above and below and transversely across the path of longitudinal feed of said strips. To facilitate the transfer of the binder cleats from the line of feed thereof effected by the rollers 124, 125, the lower members of the pairs of conveyors 128, 129 extend transversely across the path of longitudinal progression of feed of said line of strips as shown in Fig. 19. By this means the individual binder strips are fed by and between pairs of said conveyor belts or chains 128, 129, as clearly shown in Fig. 26, transversely with respect to the line of progression or feed of the assemblies of units A, and into position for the inter-engaging complemental portions B, D, to telescope the one upon or into the other. The feed rollers 124, 125, and the transferring carriers 128, 129, may be actuated in any suitable or convenient manner. I have shown a simple arrangement wherein a shaft 130 (see Fig. 24) receives rotation from some convenient driven part of the machine, (see Fig. 38). This shaft is geared to drive the shaft 131, upon which may be carried a sprocket gear 132 (see Fig. 20) by means of which the lower carrier chains 129 are actuated. In like manner, through suitable intermediate gearing the upper carrier chains 128, as well as the feed rollers 124, 125, and the glue applying roller 126, may be driven.

Of course, it will be understood that any suitable or convenient arrangement of drive gearing may be employed for actuating these several parts.

I will now describe means to hold the laterally advanced cleats in position for the tenon and groove interengagement to be effectively initiated as said cleats are pushed the one by the next succeeding one as delivered by the carriers 128, 129. The innermost cleat or binder is eventually pushed or delivered by the carriers 128, 129 into position, (see Fig. 26), for the tenon D, thereon to line up longitudinally with the grooves B, in the ends of the grouped units A. In this position the cleat rests upon an angle member 250 of the frame, and a series of abutments, shown in this instance as vertically movable freely rotatable rollers 228$^a$ (see Figs. 25, 26, 27, 28 and 29) form stops against which abuts the shoulder at the base of the tenon, said rollers bearing upon the upper surface of the tenon. In order that the rollers 228$^a$ may be yieldingly pressed down into contact with the tenon, I provide a vertically sliding and weighted plate 229$^a$, arranged to carry and hold the rollers 228$^a$ and press the same by gravity down upon the upper surface of the tenon D. A weight member for the bearing member 229$^a$ is shown at 230$^a$. The rollers 228$^a$ are positioned to freely rotate in a direction corresponding with the line of progression of the unit assemblies through the machine. If desired the action of the stop members 228$^a$ may be supplemented, or replaced, by stop devices operating upwardly from below the cleats to engage and form an abutment for the lower shoulder at the base of the tenon. Such an arrangement is shown in Figs. 40 and 41, wherein a bent rock lever 251, is pivotally mounted intermediate its ends, as at 252, beneath the angle frame member 250, with one end 253 thereof arranged to work upwardly through a slit or opening in the angle member 250, in the vertical longitudinal plane of the stop rollers 228ª. This end of the stop lever is yieldingly maintained projected upwardly above the upper surface of the horizontal portion of angle member 250. In the arrangement shown this is accomplished by means of a spring 254 connected to the opposite end of lever 251. In order to facilitate the depression of the projecting end 253 of lever 251 out of stop position, by the riding thereover of the ends of the group assemblies of units A as the latter are continuously progressed through the machine, the rear corner of the end portion 253 is rounded or leveled off as clearly shown at 255, (see Fig. 40). The provision of the stop lever device just described insures an efficient stop abutment for the cleats even in case the cleats should vary in vertical dimension sufficiently to permit them to pass beneath the upper stop rolls 228ª.

By the stop arrangement above described, not only are the cleats presented and efficiently maintained in position for the initiation of the inter-engagement of the tenon and grooves, but also as each cleat is progressed forwardly with its associated group assembly of units A, when such engagement is initiated, the advancement into like position of the next succeeding cleat or binder is not interfered with as the advancing assemblage will raise the plate 229ª and rollers 228ª and/or depressed the end 253 of lever 251, until the assemblage of units A and cleats has passed on, whereupon said plate and rollers and/or lever end, are restored to position to engage and hold the next cleat.

In the manner above described the binder cleats C, are delivered into the position shown in Fig. 26, and in the desired relation, and are frictionally held in place while the groups assembly of units A is being advanced or fed towards the same with the grooves B in the ends of the units composing the same in line with the tenons D in the cleats. The progression of feed of the grouped assembly of units being continuously forwarded without interruption, while the cleats are frictionally retained stationarily, such forward progression or feed of the assembly of units A, will eventually cause the rear end of the tongue D to initially slide longitudinally into the open end of the groove in the end surface of the forward unit A of the group and on into the aligned grooves in the other units of the group to the extent that the frictional resistance to the cleats being forced along with the assembly will permit. Should this frictional resistance be insufficient to insure the complete assembly of the cleats with the continuously progressing group of units, then the partially engaged cleat will be pushed or carried along with the group in the continuous forward progression of the latter. In that case I provide means to arrest the forward endwise advancement of the cleat so as to enable the cleats to become completely assembled with the group of units. Means to accomplish this result should be such that while the forward endwise progression of the cleats is temporarily arrested the continuous forward progression of the assembled group of units A is not interrupted or interfered with. Various means may be employed to accomplish this result. I have shown a simple arrangement for the purpose wherein I provide a stop member for the cleats which is floatingly disposed transversely across the path of progression or feed of the assembled group and against which the forward ends of the cleats abut to temporarily arrest the progression thereof while permitting the continuous forward progression of the group of units A. When the cleats are forced completely home in assembled relation with the group of units, the continuous feed of the complete assembly raises the stop member to permit the completed assembly to pass on, whereupon the stop member referred to drops back into proper place to perform its function with the next group. The stop member 227 (see Figs. 30, 31 and 32) is carried by the free ends of the arms 138, the other ends of said arms being connected to a shaft 139, which is carried in vertical arms 228. Forward extensions 141 from the upper ends of the vertical arm 228, carry adjustable weights 140. A brace rod 229 connects the upper ends of the vertical arms 228. A stop frame 230, serves to limit the downward movement of the extensions 141. If desired tension springs 231 may be interposed between the extensions 141 and arms 138, the tension of which tends to raise the floating stop plate.

By the means above described the stop plate is yieldingly maintained floatingly in position to prevent endwise movement of the binder cleats during the operation of completing the inter-engagement of the tongues D and grooves B of the strips C and units A, respectively. When, however, in the continuous progression of the group assembly of units A through the machine, the pusher bars 88 of the group feeding chains arrive adjacent the rear ends of the binder strips in completing the inter-engagement of the portions B and D, then the ends of the pusher bars 88 engage against the rear ends of the binder strips C, so as to cause the now completely engaged binder strip and assembly of units A, to move or progress together. The power applied by the carriers 46, 47 in moving the pusher bars 88, serves to overcome the yieldingly resistance of the yielding stop member afforded by the adjustable weights 140, and said stop member is raised out of the way to permit the composite board assembly to pass on beneath it. After one composite board assembly passes beyond the stop plate, said stop plate automatically drops back into position to perform its function in the assembling operation for the next group of units A and its associated binder strips or cleats C.

From the foregoing description it will be seen that I provide means which are simple and efficient for assembling together the successive groups of unit assemblies with their respective binder cleats, and in a manner that secures a most desirable spreading of the glue material along the engaging surfaces of the tenon and grooves of said unit groups and cleats respectively. This is an important and valuable feature of my invention as thereby a supply of the glue material throughout the lengths of the binders or cleats is assured. This result is secured by supplying the glue materials to only the under surface of the tenon and to the surface of the bottom wall of the grooves. By so applying the glue material the tendency of the one surface contacting with and sliding along that of the other instead of scraping off the glue material, in the direction of movement of the parts to be joined, when said surfaces are relatively moved, as is ordinarily the case, the one surface distributes the glue material towards one end of the joint in one direction and the other surface distributes the glue material towards the other end of the joint, and hence I insure an efficient gluing action at both ends of the binder or cleat, and that is where the need is greatest for such gluing to be the most effective. Moreover, by effecting the inter-engagement of the tongues and grooves in the direction of the lengths of the tongues and in the manner above described, I avoid any tendency of the tongue splitting the walls of the grooves, since the inter-engagement referred to is effected progressively in the direction of travel or progression of the unit assemblies. This avoids undue splitting strains.

After the binder cleats and assembly of units A have been assembled together in the manner above described, and progressed beyond the stop plate or member referred to, it is sometimes desirable to surface the now assembled composite board product. Such surfacing may be effected on either or both the upper and lower surfaces of the composite board product, and may be accomplished in any suitable or convenient or desirable manner. I have shown a simple arrangement wherein surfacing planers are located above and below the path of feed of the composite board product, and beneath a fan blower device, indicated generally at 142 by which the débris of the planing operations may be drawn off in a well known manner. Inasmuch as the planers employed may be of any form well known in the art, I have not deemed it necessary to show the same in detail. I have indicated at 143, the shaft of the upper planer. The planers may be driven in any suitable or convenient manner. I have indicated an electric motor 144 for this purpose. By the action of the surfacing planers, the entire composite board product including the unit members A and their attached binder strips or cleats C are reduced to uniform thickness irrespective of any relative initial variation in thicknesses of these members.

It may sometimes be desirable to trim off the edges of the composite board product delivered from the planer device in order to reduce the composite board structure to uniform dimensions in the direction of the length of the units A. In accordance with my invention, I propose to utilize this edge trimming operation to produce the spacer strips that are sometimes desirable to apply to the ends of boxes in order to space the boxes slightly apart from each other when stacked or piled the one upon another, as I have already pointed out. Accordingly, I employ initially, binder strips or cleats C, of such transverse width as to provide the required spacing strips during the edging operation referred to. For the purpose of effecting this edging operation I provide edging saws, 145, which are mounted on the shaft 146, disposed transversely across the machine and above the line of feed or progression of the composite board product. The edging saws 145 or the shaft 146 carrying the same may be operated or driven in any suitable manner. If desired however, a motor 147 may be employed for effecting such operation. The spacer strips severed during the edging operation are delivered from the edging cutters, preferably in one direction of further progression, while the edged and sized composite lumber product is delivered therefrom in another direction. In order to secure this separation I provide horizontal guideways 148, in the form of extensions aligning with the horizontal line of progression of feed of the composite board products to and past the edging cutters, along which guideways the severed spacer strips are pushed by the succeeding strips. The edged composite lumber product, however, passes down a forwardly inclined guideway indicated generally at 149, see Figs. 84, 85 and 86 and onto transversely operating carrier devices 150, by means of which the composite boards are fed laterally or transversely of the machine past side trimming saws or cutters 151. (See Figs. 84 and 85.) These cutters perform the function of reducing the widths of the composite lumber products to uniform dimensions.

The transversely operating delivery carriers 150 for the finished product, as well as the trimming saws 151, may be actuated in any suitable or convenient manner, and from any convenient source or either one or both may be driven from its own motor.

As before indicated, a main driving motor 85, (see Fig. 36) may be employed to drive the main drive shaft 152, and I prefer to operate all the feeding devices of the entire machine from this motor and shaft.

When individual electric motors are employed to operate the various cutting tools, saws, planers and the like the control of said motors can be quite easily effected from a common switchboard or control-box. Ordinarily, the occasion seldom arises where it is necessary to stop one or another of the cutters without stopping all of them.

Likewise, where all the feeding operations throughout the entire machine are driven from the same motor, I am enabled to secure a most effective, desirable and important co-ordination and synchronism of the various operations in a continuously operating machine, and by control of a single motor, all the feeding mechanisms of the entire machine may be simultaneously stopped and started. This is important since each feeding operation is dependent upon the proper, timely and synchronous operation of all the feeding devices.

In Fig. 37 I have shown schematically a circuit diagram wherein the individual unit motors for operating the various cutting tools, saws, planes and the like are controlled simultaneously or individually from a master-switch 250 which may be of any usual form familiar in the art.

From the foregoing description, it will be seen that I provide a simple, compact, efficient, co-ordinated machine wherein boards, strips or pieces of waste material, slabs, waste lumber, mill ends and the like, without regard to uniformity of size, length, width or other dimension may be utilized and in the manner set forth, assembled together in successive grouped assemblies which are fed successively in such grouped assemblies, and are acted upon by suitable mechanisms, which not only reduce the successive groups to uniform dimensions but also securely and effectively bind them together into their unit assemblies to produce usable, merchantable products in the form of compound or composite boards, and wherein, provision is made to carry out the operations referred to automatically and in any predetermined size of finished product, the only manual handling required being the placing of the units for each assembly into their grouped relation, side by side, for initially presenting such units in their grouped assembly into the machine and also the feeding into the machine of the binder strips to be applied thereto. Thus, I am enabled to turn to useful account what has heretofore been a waste material—the bane of the lumber producing industry, as well as manufacturing establishments where lumber is utilized. That is to say I am enabled to effect with the machine of my invention the profitable utilization of the such waste materials, in the production of composite boards or lumber, which are strong and durable and usable in the manufacture of various commercial articles.

Having now set forth the objects and nature of my invention and an illustrative structure embodying the principles thereof, I wish it to be understood that many variations and changes in the details of such structure may readily occur to persons skilled in the art without departure from the spirit and scope of my invention. I do not desire therefore, to be limited or restricted to such details.

What I claim as new and useful and of my own invention and desire to secure by Letters Patent is:

1. In the manufacture of composite boards or panels from the waste material of lumber making and using mills or plants, the method which consists in assembling unit pieces of such waste material of indiscriminate width in groups and continuously feeding forwardly each group assembly and applying to the end thereof a binder strip without interrupting its continuous forward feed.

2. In the manufacture of composite boards or panels from the waste material of lumber making and using mills or plants, the method which consists in assembling unit pieces of such waste material of indiscriminate width in groups and continuously feeding forwardly each group assembly and grooving the ends thereof and interlocking binder strips with the grooves without interrupting such continuous forward feed.

3. In the manufacture of composite boards or panels from the waste material of lumber making and using mills or plants, the method which consists in assembling unit pieces of such waste material of indiscriminate width in groups and continuously feeding forwardly such group assemblies and interlocking with the ends thereof binder strips in transverse relation thereto without interrupting such continuous forward feed.

4. In the manufacture of composite boards or panels from the waste material of lumber making and using mills or plants, the method which consists in assembling unit pieces of such waste material of indiscriminate width in groups and continuously feeding forwardly such group assemblies laterally with respect to the lengths of the units thereof, and interlocking with the ends of said assembled units a binder strip without interrupting continuous forward feed.

5. The method which consists in assembling pieces of lumber of indiscriminate dimensions side by side as units into a group, then evening the units of the group in the direction of their length and continuously feeding fowardly the group, then grooving the end surfaces of the units of the group in a line parallel to their line of progression and interlocking a binder strip with the grooved ends of the assembled units without interrupting such continuous forward feed.

6. The method which consists in assembling pieces of lumber of indiscriminate width and thickness side by side in the same plane to form a group, then forming a dovetail groove in the end surface of each unit of the group, and interlocking therewith a complementary tenon on a binder strip by continuous relative movement of the group and binder in the direction of the length of the latter.

7. The method which consists in disposing a binder strip substantially in longitudinal line with the end surfaces of a group of assembled lumber units, said strip and end surfaces having complemental engaging portions and then relatively moving said group assembly and binder strip in the direction of the length of said strip to effect the interengagement of said complemental engaging portions.

8. The method which consists in disposing a binder strip substantially in longitudinal line with the end surfaces of a group of assembled lumber units, said strip and end surfaces having complemental engaging portions and then moving said assembled group in a direction transversely to the lengths of the units thereof and in the direction of longitudinal length of said strip to effect the interengagement of said complemental engaging portions.

9. The method which consists in disposing a binder strip substantially in longitudinal line with the end surfaces of a group of assembled lumber units, said strip and end surfaces having complemental tongue and groove engaging portions, and then relatively moving said group assembly and strip continuously in a direction lengthwise of the strip to effect the inter-engagement of said tongue and groove complemental portions.

10. The method which consists in disposing a binder strip substantially in longitudinal line with the end surfaces of a group of assembled lumber units, said strip and end surfaces having complemental tongue and groove engaging portions, and then moving said group assembly in a direction transversely to the lengths of the units thereof and in the direction of length of said strip, to effect the inter-engagement of said complemental tongue and groove portions.

11. The method which consists in disposing a binder strip substantially in longitudinal line with the end surfaces of a group of assembled lumber units, said strip and end surfaces having complemental engaging portions, then applying an adhesive to said complemental engaging surfaces and relatively moving said assembly group and strip continuously in the direction of the length of the latter to effect the endwise telescopic inter-engagement of said complemental engaging portions.

12. The method which consists in disposing a binder strip substantially in longitudinal line with the end surfaces of a group of assembled lumber units, said strip and end surfaces having complemental engaging portions, and then relatively moving said group assembly and binder strip in the direction of the length of said strip to effect the interengagement of said complemental engaging portions and reducing the resulting product to standard dimensions.

13. The method which consists in disposing a binder strip substantially in longitudinal line with the end surfaces of a group of assembled lumber units, said strip and end surfaces having complemental engaging portions, and then relatively moving said group assembly and binder strip in the direction of the length of said strip to effect the interengagement of said complemental engaging portions, and simultaneously surfacing the assembled units and strips in the resulting product.

14. The method which consists in continuously progressing laterally successive group assemblies of boards, and forming grooves in the end surfaces of the units of each group assembly during such progression, and presenting binder strips having complementary engaging tenons in longitudinal line with the grooves whereby the continuous progression of the group assembly effects the interengagement of the tenons and grooves.

15. The method which consists in continuously feeding forwardly in a direction transverse to the lengths of the unit thereof successive group assemblies of boards, and during such continuous feed forming grooves in the end surfaces of the units of each group assembly and presenting binder strips having complementary engaging tenons in longitudinal line with the grooves whereby the continuous feed of the group assembly effects the endwise telescopic inter-engagement of the tenons and grooves and simultaneously surfacing the assembled strips and group assemblies.

16. The method which consists in continuously feeding forwardly in a direction transverse to the lengths of the units thereof successive group assemblies of boards, and forming grooves in the end surfaces of the units of each group assembly during such progression and presenting binder strips having complementary engaging tenons in longitudinal line with the grooves whereby the continuous feed of the group assembly effects the endwise telescopic inter-engagement of the tenons and grooves and reducing each successive assembly of strips and group assemblies to uniform dimensions.

17. In a machine for making composite lumber, the combination with means for assembling pieces of boards in group assemblies of units, means for progressing the group assembly of units as a group laterally, grooving mechanism disposed at the side of the line of progression of the end surfaces of the grouped units, and means to present tenoned binder strips with the tenons thereof in longitudinal line with said grooves whereby the progression of the group assembly effects the inter-engagement of said tenons and grooves.

18. In a machine of the class described, means to assemble pieces of lumber of indiscriminate width and thickness, side by side, in the same plane to form a group, means to continuously feed said group in a direction transverse to the lengths of the units thereof, grooving devices arranged to form a continuous line of grooves in the end surfaces of the units of said group during the progression of the latter, in combination with means to deliver tenoned binder strips in longitudinal line with said grooves.

19. In a machine of the class described, means to assemble pieces of lumber of indiscriminate width and thickness, side by side, in the same plane to form a group, means to progress said group laterally, grooving devices arranged to form a continuous line of grooves in the end surfaces of the units of said group during the progression of the latter, in combination with means to deliver tenoned binder strips in longitudinal line with said grooves and means to apply an adhesive respectively to the strip tenon, and the grooves before inter-engagement thereof.

20. In a machine of the class described, means to assemble pieces of lumber of indiscriminate width and thickness, side by side, in the same plane to form a group, means to progress said group laterally, grooving devices arranged to form a continuous line of grooves in the end surfaces of the units of said group during the progression of the latter, in combination with means to deliver tenoned binder strips in longitudinal line with said grooves, and devices arranged in the path of progression of the assembled strips and group of units for edging said strips.

21. In a machine of the class described, means to assemble pieces of lumber of indiscriminate width and thickness, side by side, in the same plane to form a group, means to progress said group laterally, grooving devices arranged to form a continuous line of grooves in the end surfaces of the units of said group during the progression of the latter, in combination with means to deliver tenoned binder strips in longitudinal line with said grooves and means to surface the assembled strips and grouped units.

22. In a machine of the class described, means to assemble pieces of lumber of indiscriminate width and thickness, side by side, in the same plane to form a group, means to progress said group laterally, grooving devices arranged to form a continuous line of grooves in the end surfaces of the units of said group during the progression of the latter, in combination with means to deliver tenoned binder strips in longitudinal line with said grooves and means to reduce to uniform dimensions successive assemblies of strips and grouped units.

23. In an apparatus of the class described, means to assemble pieces of lumber side by side as units into a group, progressing devices for the assembled group and to which such group assembly is delivered, said progressing means operating in a direction transverse to the length of the units of the group, grooving devices arranged adjacent the line of progression of the end surfaces of the units of said group, and means to present tenoned binder strips into position for the tenons thereon to longitudinally align with said grooves, whereby the inter-engagement of said tenons and grooves is effected by the progression of the group assembly.

24. In an apparatus of the class described, feeding devices to receive and to continuously feed in a direction transverse to the lengths of the units thereof successive group assemblies of unit boards, in combination with means to apply a binder strip to the ends of the units of each group without interrupting the continuous feed of such group.

25. In a machine of the class described, the combination with means to receive and continuously feed laterally, successive group assemblies of board units and means to form a groove in the end surface of each unit of the group during the progression of such group, of means to apply a tenoned binder strip to the grooves of the unit assembly without interrupting the continuous progression of the group.

26. In a machine of the class described, the combination wth means to receive and continuously feed laterally, successive group assemblies of board units and means to form a groove in the end surface of each unit of the group during the progression of such group, of means to apply a tenoned binder strip to the grooves of the unit assembly without interrupting the continuous progression of the group, and means to apply an adhesive to the inter-engaging surfaces of the tenons and grooves in advance of the inter-engagement thereof.

27. In a machine of the class described, means to receive and continuously feed laterally board or lumber units arranged in a group and having the grain thereof extending longitudinally of the units, means to form a groove in the end surfaces of the group assembly during the continuous feed of the group in combination with means to apply a tenoned binder strip longitudinally in inter-engagement with the tenon and grooves, the grain of the binder strip extending longitudinally thereof.

28. In a machine of the class described, a feed hopper adapted to receive pieces of lumber in successive superposed layers, means to feed the lowermost layer as a group lengthwise of the units thereof from said hopper, a carrier operating in a direction transversely to the length of the units of the delivered group, and upon which said group is delivered, means for continuously operating said carrier, and means to apply to the ends of the units of the assembled group a binder strip to connect and bind said units together without interrupting the continuous feed of the group.

29. In a machine of the class described, a hopper adapted to receive the pieces of board disposed in successively superposed layers, means for periodically advancing simultaneously all of the units composing the lowermost layer as a group, a carrier to which said group assemblies are successively delivered, said carrier operating to feed or progress the delivered group assembly in a direction laterally of the units of said group, devices arranged adjacent to the line of progression of the end surfaces of said units, operating to form a groove therein, in combination with a tenoned binder strip feeding mechanism arranged to deliver the tenoned strips with the tenons in longitudinal line with the grooves in the units of the group and assembly.

30. In a machine of the class described, a feed hopper having compartments to respectively receive stacks or piles of pieces of lumber, said compartments being adjacent each other in side by side relation, whereby the lowest layer of pieces in all the compartments constitutes a group assembly of said pieces, means to deliver from said hopper periodically and successively, the lowermost layer of units as a group assembly, a carrier to which the group assemblies are successively delivered and means for continuously operating said carrier, in combination with devices to form grooves in the end surfaces of the units of the successive groups and devices for applying a binder strip to the grooved end surfaces of the grouped units during the continuous operation of the carrier.

31. In a machine of the class described, a feed hopper to receive pieces of lumber disposed in successive superposed layers, each layer including a plurality of said pieces of indiscriminate widths, means to feed the lowermost layer as a group in a direction lengthwise of the units thereof from said hopper, and means operated by said feeding means to laterally press said units into edge contact with each other.

32. In a machine of the class described, a feed hopper to receive pieces of lumber disposed in successive superposed layers, each layer including a plurality of said pieces of indiscriminate widths, a reciprocatory plunger operating upon the lowermost layer as a group to feed said group from the hopper, in a direction lengthwise of the units, in combination with a transversely moving pusher member disposed at one side of the line of feed and operating to crowd or push units of the group against each other edgewise while being fed from the hopper, said pusher member being operated by said plunger.

33. In a machine of the class described, a feed hopper adapted to receive pieces of lumber of indiscriminate width, in side by side relation to form a group, a reciprocatory plunger operating to simultaneously feed from the hopper all of the units of a group in the direction of the length of such units, in combination with a positively operated, yieldingly mounted pusher member arranged at one side of the line of feed of the group and operating transversely thereof to crowd the units of the group in compact, edgewise contact with each other, said pusher member being operated by said plunger.

34. In a machine of the class described, a feed hopper adapted to receive pieces of lumber of indiscriminate width, in side by side relation to form a group, a reciprocatory plunger operating to simultaneously feed from the hopper all of the units of a group in the direction of the length of such units, in combination with a positively operated, yieldingly mounted pusher member arranged at one side of the line of feed of the group and operating transversely thereof to crowd the units of the group in compact, edgewise contact with each other, and means operated by the actuation of the feed plunger for operating said transverse pusher member.

35. In a machine of the class described, a feed hopper to receive pieces of lumber of indiscriminate width disposed side by side, and in superposed layers, a reciprocatory plunger and means for operating the same to advance the lowermost layer as a group from the hopper, a pusher member disposed at one side of the line of feed of the group and operating transversely thereof to push or crowd the members of the group laterally against each other into compact relation as the same is fed from the hopper, a rock lever for actuating said pusher member, and means actuated by the operation of the reciprocatory plunger for rocking said lever.

36. In a machine of the class described, a feed hopper to receive pieces of lumber of indiscriminate width disposed side by side, and in superposed layers, a reciprocatory plunger and means for operating the same to advance the lowermost layer as a group from the hopper, a pusher member disposed at one side of the line of movement of the group and operating transversely thereof to push or crowd the members of the group laterally against each other into compact relation as the same is fed from the hopper, a rock lever for actuating said pusher member, and means actuated by the operation of the reciprocatory plungers for rocking said lever, said pusher member having yielding connection to said lever.

37. In a machine of the class described, a feed hopper having one or more separating or division plates adjustably mounted therein to divide the same into a plurality of compartments, each compartment adapted to receive one or more pieces of lumber of indiscriminate width in superposed layers, said division plates terminating above the lowermost layer and means for simultaneously advancing the lowermost layer of units from all of said compartments in a group assembly of such units, in combination with a continuously operating carrier to receive the advanced groups of units, said carrier operating in a direction transverse to the line of feed of the group from the hopper, means for applying to the successive groups binder strips as said groups are continuously moved by said carrier and means for bringing the units of the lowermost layer in direct lateral contact with each other while being fed to the continuously moving conveyer.

38. In a machine of the class described, a feed hopper having one or more separating or division plates adjustably mounted therein to divide the same into a plurality of compartments, each compartment adapted to receive one or more pieces of lumber of indiscriminate width, in superposed layers, said division plates terminating above the lowermost layer and means for simultaneously advancing the lowermost layer of units from all of said compartments in a group assembly of such units a continuously operating carrier to which the group assembly is delivered from the hopper, and means to form channels in the ends of the units of each group, and means for applying binder strips in said channels as the group is continuously advanced by said carrier and means for bringing the units of the lowermost layer in direct lateral contact with each other while being fed to the continuously moving conveyer.

39. In a machine of the class described and in combination with a hopper adapted to receive a plurality of pieces or units of lumber disposed therein in superposed groups the units in each group beind disposed in side by side relation to form a single layer and means for advancing the lowermost layer as a group from said hopper, in combination with feed rolls between and through which said group of units is progressed, one of said feed rolls being formed of floatingly mounted sections, and means for rotating said feed rolls, said combination being adapted to hold the units in aligned relation while being progressed.

40. In a machine of the class described and in combination with means for feeding in group assembly a plurality of pieces of lumber disposed side by side in the same plane with each other, in combination with a pair of shafts between which said group assembly is progressed and feed rolls carried by said shafts, one of said feed rolls being composed of sections, each section connected to rotate with the shaft on which it is mounted but mounted thereon for lateral movement with relation thereto.

41. In a machine of the class described and in combination with means for feeding in group assembly a plurality of pieces of lumber disposed side by side in the same plane with each other, in combination with a pair of shafts between which said group assembly is progressed and feed rolls carried by said shafts, one of said feed rolls being composed of sections, each section connected to rotate with the shaft on which it is mounted but mounted thereon for the lateral movement with relation thereto and means to yieldingly resist the lateral movements of said sections.

42. In a machine of the class described and in combination with means for feeding successively groups of units or pieces of lumber disposed side by side, in group assembly, in combination with a pair of feed rolls between and through which said group assemblies are fed, one of said feed rolls being formed in sections, each section mounted for rotative and lateral movements, a bearing block engaging said roller sections and means to yieldingly press said bearing blocks in contact with their roller sections to resist lateral movements thereof.

43. In a machine of the class described, a hopper adapted to receive units or pieces of lumber of indiscriminate width, disposed in side by side relation in the same plane with each other to constitute a group, the groups being superposed in successive layers and means for advancing from said hopper simultaneously all of the units composing the lowermost layer or group, feed rolls to receive and progress said advanced group in the direction of the length of the units composing the same, continuously operating feed devices arranged to receive the group of units from said feed rolls and to feed the same in transverse relation to the direction of operation of said feed rolls, and gearing to synchronously operate said feed rolls and feeding devices said feed rolls acting to progress the units in each layer in aligned relation.

44. In a machine of the class described, a hopper adapted to receive units or pieces of lumber disposed in side by side relation in the same plane with each other to form a group assembly and means to advance the group assembly from said hopper in a direction lengthwise of said units, supporting rails disposed transversely to the line of advancement of said assembly from the hopper, said rails adapted to receive and support transversely thereacross the advanced group, continuously operating carrier chains arranged alongside of said rails and adapted to engage and advance therewith the group assembly of units as a group and a retainer plate or apron disposed above said rails and beneath which the group of units are delivered onto said rails, said retainer plate operating to maintain said units in proper position relatively to each other while being engaged by said carrier chains.

45. In a machine of the class described, a hopper adapted to receive units or pieces of lumber disposed in side by side relation in the same plane with each other to form a group assembly and means to advance the group assembly from said hopper in a direction lengthwise of said units, supporting rails disposed transversely to the line of advancement of said assembly from the hopper, said rails adapted to receive and support transversely thereacross the advanced group, continuously operating carrier chains arranged alongside of said rails and adapted to engage and feed the group assembly of units as a group and a retainer plate or apron disposed above said rails and beneath which the group of units are delivered onto said rails to maintain said units in proper position relatively to each other while being engaged by said carrier chains, said apron or plate being yielding.

46. In a machine of the class described and in combination with carrier chains adapted to receive and feed successive assemblies of units or pieces of lumber disposed side by side and in the same plane with each other in group formation and means for operating said chains, of a supporting plate disposed longitudinally between and above said carrier chains and in central relation with respect to the space between them, and independent bearing blocks carried by said plate and arranged to bear upon the units of the group assemblies while being progressed by said chains, said bearing blocks each being yieldingly suspended from said plate for independent relative displacement both vertically and laterally with respect to each other.

47. In a machine of the class described and in combination with carrier chains adapted to receive and feed successive assemblies of units or pieces of lumber disposed side by side in the same plane with each other in group formation and means for operating said chains, of a supporting plate disposed longitudinally between and above said carrier chains and in central relation with respect to the space between them, and independently yieldable blocks carried by said plate and arranged to bear successively upon the units of the group assemblies while being progressed by said chains and a presser bar extending in the direction of operation of said carrier chains and to one side of said supporting plate beneath which the unit members of the group assemblies are carried and held in the region of their ends while being progressed by said carrier chains.

48. In a machine of the class described and in combination with continuously operating carrier chains and means to deliver transversely thereacross units or pieces of lumber disposed side by side in group formation, of a rail member extending longitudinally with respect to the direction of operation of said carrier chains and constituting an abutment for the forward ends of the units of the group, said abutment member being slightly inclined for a portion of its length with relation to the line of progression of the carrier chains to aid in evening the end surfaces of the units relatively to each other, and presser devices arranged to engage unit pieces of the group from above to maintain them in uniform relation in the group while being progressed by said chains.

49. In a machine of the class described, the combination with continuously operating carriers and means to deliver transversely thereacross, units or pieces of lumber arranged in group assemblies for progression as groups by said carriers and means for maintaining the end surfaces of the units of the groups in line with each other while being progressed by the carriers, of grooving devices disposed at opposite sides of the carriers and operating to form an alined engaging dovetail groove in the end surface of each unit of each group as the groups are successively fed therepast.

50. In a machine of the class described, the combination with continuously operating carriers and means to deliver transversely thereacross, units or pieces of lumber arranged in group assemblies for progression as groups by said carriers and means for maintaining the end surfaces of the units of the groups in line and in fixed relation with respect to each other while being progressed by the carriers, of grooving devices disposed at opposite sides of the carriers and operating to form an alined engaging groove in the end surface of each unit of each group as the groups are successively fed therepast, said grooving devices being arranged in successive pairs, the members or each pair being inclined relatively to each other to form a groove of the dovetail shape.

51. In a machine of the class described, the combination with continuously operating carriers and means to deliver transversely theroacross, units or pieces of lumber arranged in group assemblies for progression as groups by said carriers and means for maintaining the end surfaces of the units of the groups in line and fixed relation with respect to each other while being progressed by the carriers, of grooving devices disposed at opposite sides of the carriers and operating to form an alined engaging groove in the end surface of each unit of each group as the groups are successively fed therepast, the inclination of the members of one set being in opposite direction to that of the members of the other set to form a groove of dovetail shape.

52. In a machine of the class described, the combination with continuously operating carriers and means to deliver transversely thereacross, units or pieces of lumber arranged in group assemblies for progression as groups by said carriers and means for maintaining the end surfaces of the units of the groups in line and in fixed relation with respect to each other while being progressed by the carriers, of grooving devices disposed at opposite sides of the carriers and operating to form an alining dovetail groove in the end surface of each unit of each group as the groups are successively fed therepast, a support for each grooving device, said support being mounted for adjustment to vary the position of the grooving device with relation to the line of feed of the end surfaces of the units to vary the shape of the dovetail groove.

53. In a machine of the class described, a combination with continuously operating carriers and means to deliver thereto, units or pieces of lumber arranged in group assemblies for progression as groups by said carriers and means for maintaining the units of the groups in fixed relation with respect to each other while being progressed by the carriers, of grooving devices disposed at opposite sides of the carriers and operating to form an alining dovetail groove in the end surface of each unit of each group as the groups are successively fed therepast, a vertically adjustable carrier for each grooving device and a laterally adjustable support for each carrier whereby the shape of the dovetail groove may be varied.

54. In a machine of the class described and in combination with carriers adapted to receive and continuously progress laterally units or pieces of lumber disposed transversely thereacross in group formation, and means disposed at opposite sides of said carrier devices to form alined dovetail shaped grooves in the end surfaces of the units in each groove as the groups are progressing therepast of glue applying devices disposed at opposite sides of the carrier devices and operating to deposit glue upon the surfaces of the grooves formed in said units.

55. In a machine of the class described and in combination with a carrier chain, means to deliver thereacross a plurality of units or pieces of lumber disposed side by side in group formation, whereby said group progresses laterally and means to form a groove in the end surface of each unit of the group as it progressed therepast, of a glue applying device located adjacent the line of progression of the end surface of the group beyond the groove forming device to deliver glue material to the surface of the groove in said units, said glue applying device including a tank and pipe connection delivering therefrom to the surface to receive the glue.

56. In a machine of the class described, and in combination with a carrier chain, means to deliver thereacross a plurality of units or pieces of lumber disposed side by side in group formation, whereby said group progresses laterally and means to form a groove in the end surface of each unit of the group as it is progressed therepast, of a glue applying device located adjacent the line of progression of the end surface of the group beyond the groove forming device to deliver glue material to the surface of the groove in said units, said glue applying device including a container hinged to rock in a direction transverse to the line of feed of the group assembly and having means adapted to deliver to the surface which is to receive the glue material.

57. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to successively deliver binder strips, having engaging projections thereon lengthwise with respect to the line of continuous feed of the carriers into position for the engaging projections thereof to align with the grooves in the end surfaces of the units of the groups.

58. In a machine of the class described and in combination with a continuously operating carrier and means to deliver a plurality of units or pieces of lumber transversely thereacross, said units being disposed side by side and in group formation, means to form alined engaging grooves in the end surfaces of the units of each group as said group is progressed by said carrier, of means operating transversely along the line of feed of the carrier to deliver successively binder strips, having complemental engaging projections thereon disposed lengthwise with respect to the line of feed of the carriers and into position for the engaging projections thereof to align with the grooves in the end surfaces of the units of the groups and means to apply glue material respectively to the surfaces of the grooves and of the engaging projections.

59. In a machine of the class described and in combination with a continuously operating carrier and means to deliver a plurality of units or pieces of lumber transversely thereacross, said units being disposed side by side and in group formation, means to form alined engaging grooves in the end surfaces of the units of each group as said group is progressed by said carrier, of means operating transversely of the line of feed of the carriers to successively deliver binder strips, having complemental engaging projections thereon and disposed in position to aline with said grooves, means to apply glue material respectively to the lower surface of the grooves and the bottom surface of said projections.

60. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups and means to yieldingly maintain the binder strips in position for the projection thereon to telescope into the grooves in the end surfaces of the units of the groove.

61. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups, and a yielding stop device arranged to engage the shoulder of the projection on the binder strips as the latter are successively brought into position for the projections thereof to align with the grooves in the ends of the units.

62. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups, a floatingly mounted yieldable stop device to retard endwise movement of the binder while being telescoped into engagement with the grooves in the end surfaces of the units of the group assembly.

63. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups and a vertically, shiftable stop device arranged to engage a shoulder on the binders as the latter are successively brought into position for engaging projections thereon to align with the grooves in the end surfaces of the units of the group assembly.

64. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups, and a vertically movable plate having butting members arranged to form a stop to limit and define the position of the binders when brought into line with the grooves in the units of the group assembly.

65. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups and a yieldable stop device arranged to be engaged by the forward end of the binder to arrest the endwise movement thereof while the binder is being telescoped into the grooves in the end surfaces of the units of the group assemblies.

66. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups and a yieldable stop device arranged to be engaged by the forward end of the binder to arrest the endwise movement thereof while the binder is being telescoped into the grooves in the end surfaces of the units of the group assemblies, and a pivotally mounted frame carrying said stop device.

67. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the group and a yieldable stop device arranged to be engaged by the forward end of the binder to arrest the endwise movement thereof while the binder is being telescoped into the grooves in the end surfaces of the units of the group assemblies and a vertically yieldable floating frame carrying said stop device.

68. In a machine of the class described and in combination with a continuously operating carrier and means to deliver a plurality of units or pieces of lumber transversely thereacross, said units being disposed side by side and in group formation, means to form engaging grooves in the end surfaces of the units of each group as said group is progressed by said carrier, of means operating transversely along the line of feed of the carriers to deliver binder strips, having engaging projections thereon lengthwise with respect to the line of feed of the carriers into position for the engaging projections thereof to align with the grooves in the end surfaces of the units of the groups and a yieldable stop device arranged to be engaged by the forward end of the binder to arrest the endwise movement thereof while the binder is being telescoped into the grooves in the end surfaces of the units of the group assemblies, a floatingly mounted frame carrying said stop device and weighted arms connected to said frame.

69. In a machine of the class described and and in combination with means to continuously feed the units or pieces of lumber in group formation, means to form grooves in the end surfaces of the units of each group and means to apply binder strips in engaging connection with said grooves without interrupting the continuous feed of said groups, of means to simultaneously surface said units and binders after application to each other.

70. In a machine of the class described and in combination with means to continuously feed the units or pieces of lumber in group formation, means to form grooves in the end surfaces of the units of each group and means to apply binder strips in engaging connection with said grooves without interrupting the continuous feed of said groups, of means to simultaneously surface said units and binders after application to each other and means to trim the entire assembly of units and binders to uniform length dimensions.

71. In a machine of the class described and in combination with means to continuously feed the units or pieces of lumber in group formation, means to form grooves in the end surfaces of the units of each group and means to apply binder strips in engaging connections with said grooves during the continuous feed of said groups, of means to simultaneously surface said units and binders after application to each other, and means to trim the entire assemblage of units and binders to uniform dimensions.

72. In a machine of the class described and in combination with means to continuously feed the units or pieces of lumber in group formation, means to form grooves in the end surfaces of the units of each group and means to apply binder strips in engaging connection with said grooves during the continuous feed of the groups.

73. In a machine of the class described and in combination with means to continuously feed the units or pieces of lumber in group formation, means to form grooves in the end surfaces of the units of each group and means to apply binder strips in engaging connection with said grooves during the continuous feed of the groups, an edger arranged to rip a spacer strip from the outer edge portion of said binder, and serving to reduce the entire assembly of unit groups and binder to uniform dimension in the direction of the length of the units.

In testimony whereof, I have hereunto set my hand on this 25th day of January, A. D. 1927.

ALBERT EARL CRANSTON.